United States Patent
Gambaro et al.

(10) Patent No.: US 12,255,369 B2
(45) Date of Patent: Mar. 18, 2025

(54) ZIPPED ION-EXCHANGE MEMBRANE

(71) Applicant: ENI S.P.A., Rome (IT)

(72) Inventors: Chiara Gambaro, Novara (IT); Laura Meda, Novara (IT); Vito Di Noto, Cadoneghe (IT); Keti Vezzu', Padua (IT); Chuanyu Sun, Padua (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 17/632,102

(22) PCT Filed: Jul. 30, 2020

(86) PCT No.: PCT/IB2020/057217
§ 371 (c)(1),
(2) Date: Feb. 1, 2022

(87) PCT Pub. No.: WO2021/019497
PCT Pub. Date: Feb. 4, 2021

(65) Prior Publication Data
US 2022/0278346 A1 Sep. 1, 2022

(30) Foreign Application Priority Data
Aug. 1, 2019 (IT) .................. 102019000013734

(51) Int. Cl.
*H01M 8/1044* (2016.01)
*H01M 8/1023* (2016.01)
(Continued)

(52) U.S. Cl.
CPC ....... *H01M 8/1044* (2013.01); *H01M 8/1023* (2013.01); *H01M 8/1025* (2013.01);
(Continued)

(58) Field of Classification Search
CPC ............ H01M 8/1044; H01M 8/1023; H01M 8/1025; H01M 8/1039; H01M 8/1051;
(Continued)

(56) References Cited

U.S. PATENT DOCUMENTS

2005/0244707 A1   11/2005   Skyllas-Kazacos et al.

FOREIGN PATENT DOCUMENTS

| CN | 104804207 A | 7/2015 |
| EP | 2490279 B1 | 8/2017 |

(Continued)

OTHER PUBLICATIONS

Cho et al. KR20160048431A. May 4, 2016. English machine translation by EPO. (Year: 2016).*
(Continued)

*Primary Examiner* — James Lee
(74) *Attorney, Agent, or Firm* — CANTOR COLBURN LLP

(57) ABSTRACT

A zipped ion-exchange membrane (Z-IEM) having at least one cation-exchange polyelectrolyte (CEP) crosslinked with at least one anion-exchange polyelectrolyte (AEP), wherein the CEP has a molar fraction of positive charges (x) so that: (i) when x=0.5, the Z-IEM is a completely neutralized ion-exchange membrane; (ii) when x>0.5, the Z-IEM is a cation-conducting ion-exchange membrane; (iii) when x<0.5, the Z-IEM is an anion-conducting ion-exchange membrane.
The above zipped ion-exchange membrane (Z-IEM): (i) is based on a polymeric matrix; (ii) is endowed with a high conductivity for ionic species such as either $H_3O^+$, $OH^-$ or halides such as $F^-$, $Cl^-$, $Br^-$, and $I^-$; and (iii) is able to block as much as possible the crossover of other ionic species, such as: cations such as $V^{2+}$, $V^{3+}$, $VO^{2+}$, $VO_2^+$, $Fe^{2+}$, $Fe^{3+}$, $Cr^{2+}$, $Cr^{3+}$, $Ce^{3+}$, $Ce^{4+}$, $Ti^{3+}$, $Ti^{4+}$, $Mn^{2+}$, $Mn^{3+}$, $Zn^{2+}$, $Pb^{2+}$,
(Continued)

Figure 1:
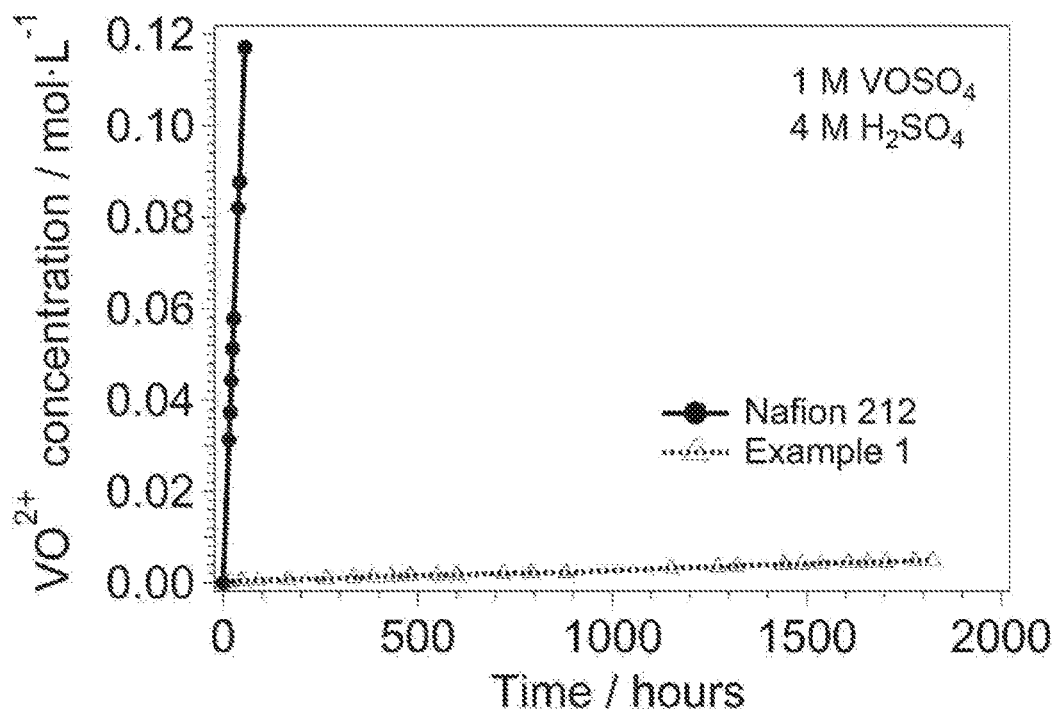
Figure 1:
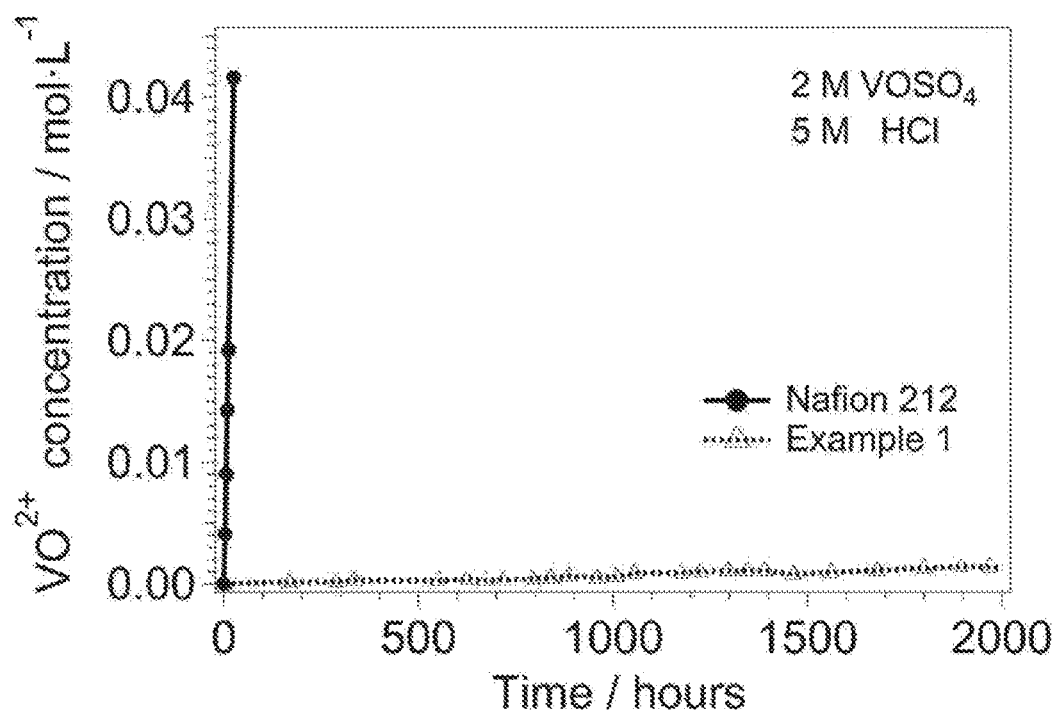

$Np^{3+}$, $Np^{4+}$, $NpO_2^{2+}$, $NpO_2^+$, $Li^+$, $Na^+$, $K^+$, $Rb^+$, $Cs^+$, $Mg^{2+}$, $Ca^{2+}$, $Sr^{2+}$, $Ba^{2+}$; and anions such as $F^-$, $BF_4^-$, $Cl^-$, $ClO^-$, $ClO_2^-$, $ClO_3^-$, $ClO_4^-$, $Br^-$, $Br_3^-$, $I^-$, $I_3^-$.

12 Claims, 7 Drawing Sheets

(51) Int. Cl.

| | |
|---|---|
| H01M 8/1025 | (2016.01) |
| H01M 8/1039 | (2016.01) |
| H01M 8/1051 | (2016.01) |
| H01M 8/1081 | (2016.01) |
| H01M 8/1086 | (2016.01) |
| H01M 8/1016 | (2016.01) |

(52) U.S. Cl.
CPC ....... *H01M 8/1039* (2013.01); *H01M 8/1051* (2013.01); *H01M 8/1081* (2013.01); *H01M 8/109* (2013.01); *H01M 8/1093* (2013.01); H01M 8/1016 (2013.01)

(58) Field of Classification Search
CPC .. H01M 8/1081; H01M 8/109; H01M 8/1093; H01M 8/1016
See application file for complete search history.

(56) References Cited

FOREIGN PATENT DOCUMENTS

| | | |
|---|---|---|
| JP | H10172600 A | 6/1998 |
| KR | 1020160048431 A | 5/2016 |
| KR | 20160128046 A | 11/2016 |
| WO | 2012017348 A1 | 2/2012 |
| WO | 2016064181 A1 | 4/2016 |

OTHER PUBLICATIONS

Chinese Office Action for Chinese Application No. 202080056134.9, dated Aug. 1, 2023, 33 pages with translation.
Alan M. Pezeshki et al. "High performance electrodes in vanadium redox flow batteries through oxygen-entriched thermal activation", Journal of Power Sources, ScienceDirect, 2015, vol. 294, pp. 333-338.
Che-Nan Sun et al. "Evaluation of Diels-Alder poly (phenylene) anion exchange membranes in all-vanadium redox flow batteries", Electrochemistry Communications, ScienceDirect, 2014, vol. 43, pp. 63-66.
Chuanyu Sun et al. "[Nafion/(WO3)x] hybrid membranes for vanadium redox flow batteries", Solid State Ionics, ScienceDirect, 2018, vol. 319, pp. 110-116.
Dongbo Xing et al. "Preparation and characterization of chloromethylated/quanternized poly (phthalazione ether sulfone) anion exchange membrane", Materials Science and Engineering B, ScienceDirect, 2009, vol. 157, pp. 1-5.
Graemi Nawn, et al. "Opening Doors to Future Electrochemical Energy Devices: The Anion-Conducting Polyketone Polyelectrolytes", Advance Functional Materials, 2018, vol. 28, No. 1706522, pp. 1-10.
Helen Prifti et al. "Membranes for Redox Flow Battery Applications", Membranes, Dec. 19, 2012, vol. 2, No. 4, pp. 275-306.
Hyeongrae Cho et al. "Application of Novel Anion-Exhange Blend Membranes (AEBMs) to Vanadium Redox Flow Batteries", Membranes, Jun. 19, 2018, vol. 8, No. 33, pp. 1-16.
International Search Report issued Sep. 15, 2020 re: Application No. PCT/IB2020/057217, pp. 1-4, citing: H. Cho et la. "Application of Novel . . . ", H. Prifti et al. "Membranes for Redox . . . ", KR 2016 0048431 A and M. Jung et al. "Blending polybenzimidazole . . . ".
Keti Vezzu et al. "Interplay Between Hydroxyl Density and Relaxations in Poly(vinylbenzyltrimethylammonium-b-poly(methylbutylene) Membranes for Electrochemical Applications", Journal of the American Checmical Society, 2018, vol. 140, pp. 1372-1384.
M. Skyllas-Kazacos et al. "Progress in Flow Battery Research and Devepment", Journal of the Electrochemical Society, 2011, vol. 158, No. 8, pp. R55-R79.
Mina Jung et al. "Blending polybenzimidazole with an anion exhange polymer increases the efficiency of vanadium redox flow batteries" Journal of Membrane Science, Jun. 1, 2019, vol. 580, pp. 110-116.
Shouhai Zhang et al. "Preparation of chloromethylated/quaternized poly(phthalazinone ether ketone" anion exchange membrane materials for vanadium redox flow battery applications, Journal of Membrane Science, ScienceDirect, 2010, vol. 363, pp. 243-249.
Timothy D. Largier et al. "Random quaternary ammunioum Diels-Alder poly(phenylene) copolymers for improved vanadium redox flow batteries", Journal of Power Sources, ScienceDirect, 2017, vol. 352, pp. 149-155.
Vito Di Noto et al. "Broadband electric spectroscopy of proton SPEEK membranes", Journal of Membrane Science, ScienceDirect, 2012, vol. 390, pp. 58-67.
Vito Di Noto et al. "Hybrid inorganic-organic proton conducting membranes based on Nafion and 5wt% of MxOy (M=Ti, Zr, Hf, Ta and W). Part II: Relaxation phenomena and conductivity mechanism" Journal of Power Sources, ScienceDirect, 2009, vol. 187, pp. 57-66.
Vito Di Noto et al. "Inorganic-organic membranes based on Nafion [(ZrO2) (HfO2)0.25] and [(SiO2) (Hfo2)0.28]. Part I: Synthesis, thermal stability and performance in a single PEMFC", International Journal of Hydrogen Energy, ScienceDirect, 2012, vol. 37, pp. 6199-6214.
Vito Di Noto et al. "Interplace between Mechanical, Electrical, and Thermal Relaxations in Nanocomposite Proton Conducting Membranes Based on Nafion and a [(ZrO2) (Ta2O5)o. 119] Core-Shell Nanofiller" Journal of the American Chemical Society, 2012, vol. 134, pp. 19099-19107.
Vito Di Noto et al. "New inorganic-organic proton conducting membranes based on Nafion and [ZrO2)'(SiO2)0.67] nanoparticles: Synthesis vibrational studies and conductivity", ScienceDirect, Journal of Power Sources, 2008, vol. 178, pp. 561-574.
Vito Di Noto et al. "New inorganic-organic proton conducting membranes based on Nation and hydrophobic fluoroalkylated silica nanoparticles", Journal of Power Sources, ScienceDirect, 2010, vol. 195, pp. 7734-7742.
Vito Di Noto et al. "Structure-Relaxation Interplay of a New Nanostructured Membrane Based on Tetraethylammonium Trifluoromethanesulfonate Ionic Liquid and Netralized Naflon 117 for High-Temperature Fuel Cells", Journal American Chemical Society, 2010, vol. 132, pp. 2183-2195.
Written Opinion issued Sep. 15, 2020 re: Application No. PCT/IB2020/057217, pp. 1-5, citing: H. Cho et la. "Application of Novel . . . ", H. Prifti et al. "Membranes for Redox . . . ", KR 2016 0048431 A and M. Jung et al. "Blending polybenzimidazole . . . "
Yan Li et al. "Quanternized membranes bearing zwitterionic groups for vanadium redox flow battery through a green route", Journal of Membrane Science, ScienceDirect, 2015, vol. 483, pp. 60-69.

\* cited by examiner

ZIPPED ION-EXCHANGE MEMBRANE

TECHNICAL FIELD

The present disclosure refers to zipped ion-exchange membranes (Z-IEMs) based on a macromolecular matrix and including acid-base crosslinks. The Z-IEMs according to the present disclosure exhibit a high selectivity towards the migration of specific ions, most typically $H_3O^+$ or $OH^-$.

BACKGROUND

In its most general meaning, energy storage is "the capture of energy produced at one time for use at a later time". Among all the different energy storage technologies, particular attention has been recently devoted to those whose operation involves electrochemical reactions, grouped under the general label "electrochemical energy storage technologies" (EES technologies). EES technologies are very promising owing to their high efficiency, facile scalability, and independence from geographical constrains. This latter point is particularly relevant for systems intended for large-scale storage (typically, on the order of tens of kWh or more). Indeed, several of the most efficient non-electrochemical large-scale energy storage technologies (e.g., pumped storage hydropower or compressed air energy storage) cannot be easily implemented everywhere, but only in specific locations where suitable geological features are present (e.g., a lake, or an underground cavern). EES technologies are also particularly promising to abate the spatial and temporal mismatch between the generation of energy and its exploitation by end users, allowing for: (i) a widespread implementation of intermittent energy sources (e.g., the sun and the wind) in the power grid; and (ii) the establishment of "smart grids" covering entire continents. Furthermore, the fast response time characterizing EES technologies is also ideal to efficiently increase the value of electric power by correcting power fluctuations, and for "peak shaving" purposes.

A wide variety of different EES technologies have been developed, each with its own advantages and drawbacks. This disclosure mainly focuses on EES technologies operating at "low" temperatures (T<200° C.) and mounting an electrolytic membrane based on polymeric matrices. The latter membrane is tasked with ensuring the facile and selective migration of the charged and neutral species involved in the operation of the device, blocking all the others and thus preventing unwanted crossover phenomena. The latter lead to severe unwanted side effects, such as self-discharge, loss of capacity and loss of conversion efficiency due to the occurrence of mixed potentials. Typical examples of EES technologies according to the present disclosure are redox flow batteries (RFBs) and fuel cells (FCs). Ultimately, both of these technologies share the same fundamental features. In detail, they include a membrane allowing the selective migration of ions that is sandwiched between two electrodes, where the redox reactions involved in the operation of the device take place. In both RFBs and FCs the species involved in the redox reactions at the electrodes are provided from external reservoirs; the products of such reactions are later removed from the system. Consequently, in principle the components of RFBs and FCs are dimensionally stable upon cycling and a long durability can be achieved: RFBs can withstand thousands of charge/discharge cycles, while FCs can operate for thousands of hours. This is a crucial advantage in comparison with other EES technologies (e.g., secondary batteries), where the electrodes comprise/are impregnated with the redox species. In these latter systems, the electrodes undergo swelling/shrinking upon operation cycles; these phenomena have a negative impact on the dimensional/interfacial stability of the functional components, curtailing the maximum effective durability of these devices to a few hundred charge/discharge cycles. The main fundamental difference between RFBs and FCs is concerned with the processes they exploit to yield electrical power. FCs typically rely on the electrooxidation of hydrogen or small organic molecules by means of oxygen. These processes, while very efficient, for practical purposes are irreversible. Dedicated additional components (e.g., water electrolyzers) are typically needed to regenerate the feeds of a FC, adding to the costs and complexity of the system. At the same time, the overall conversion efficiency is degraded to 50% or lower. On the other hand, RFBs operate with liquid feeds dissolving the redox species involved in the electrode reactions. Such processes can be highly reversible, achieving overall conversion efficiencies of 85%; thus the same RFB device can be used effectively both to extract chemical energy from the feeds and turn it into electrical power, and to execute the reverse process to store the electrical power obtained from an external source into the feeds as chemical energy. Another very appealing feature of RFBs is that they are able to decouple the energy capacity (which depends on the size of the tanks filled with the feeds) from power density (that is mainly determined from the size and the geometry of the electrodes). On these bases, it can be understood why RFBs are among the most suitable EES technologies to store efficiently large amounts of energy independently from any geographical constrain.

Among all the different possible RFBs, the one who is currently attracting the most attention exploits vanadium-based feeds at both the anode and the cathode. Such systems are known as vanadium redox flow batteries (VRFBs). VRFBs are well-known in the art; for instance, they are described in M. Skyllas-Kazacos et al., J. Electrochem. Soc. 158 (2011) R55-R79. VRFBs comprise two electrolyte tanks containing the active species of vanadium in different valence states: the feed filling the anode tank includes V(II) and V(III) species, while the cathode feed dissolves the V(IV)/V(V) redox couple. In a conventional VRFB, all the active species are dissolved in a sulfuric acid medium. During the charge-discharge processes, the active species are oxidized or reduced to achieve conversion between chemical energy and electrical energy. Charge neutrality during operation of the VRFB is achieved by the transport of protons across the membrane separating the anode and cathode compartments. VRFBs present a unique advantage over other RFBs due to the fact that both the anode and the cathode feed include vanadium species; this mitigates the effects of crossover through the membrane. Furthermore, the positive and negative feeds are easily obtained from the same discharged precursor. This makes shipment and storage of electrolytes more simple and inexpensive.

The main components of a VRFB single cell are two solid electrodes, typically consisting of high surface area carbons, that sandwich an ion-exchange membrane (IEM). The IEM keeps the electrolytes separated, minimizing crossover phenomena, but allows for the migration of protons. State-of-the-art VRFBs mount proton-conducting membranes based on perfluorosulfonic acid copolymers. Such copolymers comprise a main perfluorinated polymer chain, similar to that of Teflon™, from which extend various types of perfluoroethereal side chains. The latter are terminated by a highly acid —$SO_3H$ group. Different perfluorosulfonic acid copolymers are mainly distinguished by the specific chemical structure of the perfluoroethereal side chain; the main producers of perfluorosulfonic acid copolymers are Dupont (Nafion™), 3M, Solvay-Solexis (Aquivion™) and Asahi. Pristine perfluorosulfonic acid copolymers undergo a marked phase separation into domains of different dielectric constant as they are imbibed with water. The domains having the highest dielectric constant ε include most of the water; the latter is made strongly acid by the —$SO_3H$ groups delimiting the domains. These high-ε domains are immersed into a dielectric matrix with a low-ε comprising the main perfluorinated chains and the perfluoroethereal side chains. Long-range proton conduction occurs when different high-ε domains come into contact following the relaxations in the low-ε matrix. The pristine perfluorinated copolymers described above exhibit a high proton conductivity and an excellent chemical stability. On the other hand, they are very expensive and their proton conductivity drops dramatically at low hydration levels. On these bases, perfluorosulfonic acid copolymers are very suitable for application in VRFBs. The high conductivity of these systems allows for minimized ohmic drops even at high current densities; furthermore, their excellent chemical stability enables long-term operation even in the presence of highly oxidizing/reducing vanadium species (e.g., $VO^{2+}$ and $V^{2+}$, respectively). A significant drawback of perfluorosulfonic acid copolymers as IEMs for VRFBs is their high permeability to vanadium species. This gives rise to important shortcomings, such as a relatively fast self-discharge, resulting in a significant capacity fade upon cycling. Another important issue is that the permeability to vanadium species affects the proton migration through the membrane, with the ultimate result that a net transfer of water occurs from the anode feed to the cathode feed upon cycling. This unbalance is crucial for practical applications. Indeed, as water is removed from the anode feed the concentration of vanadium species therein is raised, to the point that their solubility limit is exceeded and precipitation occurs. This makes further cycling of the VRFB impossible, setting an upper ceiling to its durability.

In order to address these points, a number of alternative IEMs were developed for application in VRFBs. Non-fluorinated proton exchange membranes (PEMs) based on polymers such as sulfonated poly(ether ether ketone), sulfonated poly(ether sulfone) and sulfonated poly(imide) have received broad attention in VRFBs. Even if the cost and ion selectivity of non-fluorinated PEMs are promising, their chemical and mechanical stability are still insufficient for application in a VRFB. Hydrocarbon membranes can be modified by incorporating aromatic groups directly into their polymer backbone. This can enhance the stability of the membrane in aggressive environments (e.g., oxidizing and acidic) such as those associated with VRFB feeds. Another strategy to obtain improved PEMs is to develop hybrid inorganic-organic systems. The latter typically include a polymer matrix able to conduct protons (e.g., Nafion), dispersing nanometric inorganic powders such as oxides and phosphates as fillers. The resulting hybrid inorganic-organic membranes may be characterized by improved proton conductivity, mechanical properties and chemical stability in comparison with the pristine proton-conducting matrix. Hybrid inorganic-organic proton-conducting membranes are well-known in the art; some examples are described in the following documents: (i) V. Di Noto et al., J. Power Sources 178 (2008) 561-574; and (ii) V. Di Noto et al., J. Power Sources 187 (2009) 57-66. VRFBs including ion-exchange membranes are also described in the technical literature, e.g., in the patents WO2016064181A1 and EP2490279B1.

In recent years new IEMs for VRFBs were developed, that ensure the charge neutrality of the system by allowing the selective migration of anions. Such anion-exchange membranes (AEMs), that typically do not comprise perfluorinated backbones, raised attention due to the repulsive effect between positive quaternary ammonium groups and vanadium ions (Donnan effect), that significantly reduces the permeability of positive vanadium species while retaining a high ion conductivity; see for instance: (i) S. Zhang et al., J. Membr. Sci. 363 (2010) 243-249; and (ii) D. Xing et al., Mater. Sci. Eng. B 157 (2009) 1-5. Conventional PEMs are essentially cation-exchange systems, as they are designed to allow the easy transport of positively-charged species such as $H_3O^+$ ions. However, both $H_3O^+$ and vanadium-based species are positively charged; thus it is very hard to design a cation-exchange membrane that is able at the same time to: (i) allow the transport of one positively-charged specie (i.e., $H_3O^+$); and (ii) block completely the migration of other positively-charged species (e.g., $V^{2+}$, $V^{3+}$, $VO^{2+}$ or $VO^{2+}$). AEMs do not suffer from this shortcoming; hence, they are promising candidates to address the issue of vanadium permeability in VRFBs. Indeed, AEMs were able to demonstrate up to 7-20 times lower $VO^{2+}$ ion permeability than that of Nafion 117, even though the AEMs taken into consideration were only ⅕ or less as thick (see for instance: C. N. Sun et al., Electrochem. Commun. 43 (2014) 63-66). In another example, random quaternary ammonium Diels-Alder poly(phenylene) copolymers were obtained (see T. D. Largier et al., J. Power Sources 352 (2017) 149-155). In this case, the $VO^{2+}$ permeability was reduced by 55.7% as compared to Nafion 117. The VRFBs mounting these materials was discharged at 10 mA/cm²; in these conditions, in comparison with reference VRFBs mounting Nafion 117 membranes, they demonstrated a 14% higher coulombic efficiency. However, the chemical degradation of AEMs, as measured by the membrane weight loss in solutions containing $V^{5+}$ ions, was significant just after one week and reaching a loss of 17% weight after 20 days; see for instance Y. Li et al., J. Membr. Sci. 483 (2015) 60-69; in the same conditions, the weight loss of Nafion reference is at least one order of magnitude lower.

The Applicant has therefore posed the problem of realizing a ion-exchange membrane (IEM) that: (i) is based on a polymeric matrix; (ii) is endowed with a high conductivity for ionic species such as either $H_3O^+$, $OH^-$ or halides such as $F^-$, $Cl^-$, $Br^-$, and $I^-$; and (iii) is able to block as much as possible the crossover of other ionic species, such as: cations such as $V^{2+}$, $V^{3+}$, $VO^{2+}$, $V^{2+}$, $Fe^{2+}$, $Fe^{3+}$, $Cr^{2+}$, $Cr^{3+}$, $Ce^{3+}$, $Ce^{4+}$, $Ti^{3+}$, $Ti^{4+}$, $Mn^{2+}$, $Mn^{3+}$, $Zn^{2+}$, $Pb^{2+}$, $Np^{3+}$, $Np^{4+}$, $NpO_2^{2+}$, $NpO_2^+$, $Li^+$, $Na^+$, $K^+$, $Rb^+$, $Cs^+$, $Mg^{2+}$, $Ca^{2+}$, $Sr^{2+}$, $Ba^{2+}$; and anions such as $F^-$, $BF_4^-$, $Cl^-$, $ClO^-$, $ClO_2^-$, $ClO_3^-$, $ClO_4^-$, $Br^-$, $Br_3^-$, $I^-$, $I_3^-$.

SUMMARY

The Applicant has now found that this problem, and others which will be better explained below, can be solved by a zipped ion-exchange membrane (Z-IEM) comprising at least one cation-exchange polyelectrolyte (CEP) crosslinked with at least one anion-exchange polyelectrolyte (AEP), wherein the CEP has a molar fraction of positive charges which can be selected to modulate the Z-IEM conductivity, as defined hereinbelow.

In a first aspect, the present disclosure therefore relates to a zipped ion-exchange membrane (Z-IEM) comprising at least one cation-exchange polyelectrolyte (CEP) crosslinked with at least one anion-exchange polyelectrolyte (AEP), wherein the CEP has a molar fraction of positive charges (x) so that:
  (i) when x=0.5, the IEM is a completely neutralized Z-IEM;
  (ii) when x>0.5, the IEM is a cation-conducting Z-IEM;
  (iii) when x<0.5, the IEM is an anion-conducting Z-IEM.

With the term "zipped ion-exchange membrane" it is meant a membrane having a molecular structure wherein a first macromolecular chain bearing positive charges is coupled to a second macromolecular chain bearing negative charges, the coupling being given by electrostatic interaction between opposite charges facing each other.

In particular, the coupling is provided by the "donor-acceptor" bonds that form between the functional groups with opposite charges located on the cation-exchange polyelectrolyte (CEP) and the anion-exchange polyelectrolyte (AEP), respectively. The "donor-acceptor" bonds arrange themselves to form a "zip-zone".

The zipped ion-exchange membrane generally exhibits a plurality of such "zip-zones".

Also, the zipped ion-exchange membrane exhibits an ordered morphology.

A schematic representation of zipped structures according to the present disclosure is given in Scheme 1 attached herewith.

The present disclosure covers several types of Z-IEMs, as follows.

Type I. These Z-IEMs are obtained by a reaction between two types of polyelectrolytes, (i) and (ii). (i) is a cation-exchange polyelectrolyte (e.g., Nafion™, Aquivion™, sulfonated polyetheretherketone); (ii) is an anion-exchange polyelectrolyte (e.g., the FAA-3 ionomer, product of Fumatech GmbH, or poly(diallyldimethylammonium hydroxide).

Type II. These Z-IEMs consist of Type I membranes, doped with fillers with different compositions and morphologies (e.g., ceramic oxoclusters).

Type III. These Z-IEMs are exactly identical as those grouped under Type I and Type II, with the only difference that the polyelectrolytes or crosslinked resin(s) are further blended with one or more other polymers that comprise neither cation- nor anion-exchange functionalities.

The common feature, exhibited by the Z-IEMs according to the present disclosure, is the inclusion in the final material of acid-base crosslinks obtained by the interaction of cation-exchange functional groups with anion-exchange functional groups that are present in different components of the system. Preferably, the cation-exchange functional groups are provided by a cation-exchange polyelectrolyte (e.g., Nafion), while the anion-exchange functional groups are provided by an anion-exchange polyelectrolyte (e.g., FAA-3 ionomer). The final Z-IEM may also additionally include another polymeric component (or a crosslinked resin) that comprise neither cation-exchange nor anion-exchange functional groups.

More specifically, as mentioned above, throughout the Z-IEM according to the disclosure, neighboring "acceptor" functional groups bearing positive charges found on AEPs interact with neighboring electron "donor" functional groups bearing negative charges found on CEPs. Consequently, in the zipped ion-exchange membrane the backbone chains of each AEP-CEP interacting system run substantially parallel to one another at the interface in a "zip-zone", wherein ordered arrays of "donor-acceptor" bonds are formed. As a result, the final zipped ion-exchange membrane exhibits a plurality of such "zip-zones" and an ordered morphology. Such "zip-zones" can be found substantially through the entire membrane.

More in particular, the above coupling at the interfaces between said at least one cation-exchange polyelectrolyte (CEP) and said at least one anion-exchange polyelectrolyte (AEP) is the result of a neutralisation reaction between each macromolecule of a given ionomer (bearing either cation or anion functionalities) with one or more macromolecules of the other ionomer (bearing either anion or cation functionalities) with the formation of a macromolecular salt.

Preferably, said neutralisation reaction is carried out by suspending or dissolving the at least one cation-exchange polyelectrolyte (CEP) and the at least one anion-exchange polyelectrolyte (AEP) in at least one solvent selected from: N,N-dimethylformamide (DMF); dimethylacetamide; 2-pyrrolidone (NMP); water; alcohols; ketones; aldehydes; carboxylic acids; amines; halogenated solvents; hydrocarbon solvents. Preferably the at least one solvent is selected from: N,N-dimethylformamide (DMF); dimethylacetamide; 2-pyrrolidone (NMP).

Such macromolecular salt is held together by strong "donor-acceptor" interactions between the different ionomer components (namely the charged functional groups found on CEPs and the AEPs). The macromolecular salt thus exhibits unique, synergic properties, much different from the features of each component taken on its own. The macromolecular salt is a nanostructured and highly organised material.

A zipped ion-exchange membrane exhibits zero net charge at the "zip-zones".

In the zipped ion-exchange membrane according to the disclosure, the strong bonding based on the interactions between "donor" and "acceptor" groups gives rise to a strongly interacting matrix and a unique mesoscale phase separation able to abate the permeability to ionic species by a modulation of the Donnan effect.

The introduction of acid-base crosslinks in the Z-IEMs of the present disclosure aims at the following:
  modulation of the domain structure of the Z-IEM at the mesoscale. This is expected to affect the ionic percolation pathways present in the system, with one or more of the following intended outcomes: (i) decoupling of the pathways mainly followed by either $H_3O^+$ or $OH^-$ species from those followed by the other cations/anions; (ii) selective promotion of the conductivity of either $H_3O^+$ or $OH^-$ species; and (iii) selective inhibition of the conductivity of the other cations/anions;
  improvement of the mechanical properties and of the chemical and electrochemical stability of the Z-IEMs. These effects are associated to the strengthening of the inter-chain interactions and the consequent inhibition of phenomena such as chain reptation or chain scission that are involved in the irreversible elongation/degradation of the Z-IEMs.

In fact, any excess charged groups form additional domains, that are hydrophilic and are heavily involved in the ion-conduction mechanism. The interfaces between the domains play a crucial role in the formation of the "through-plane" ion percolation pathways. The permittivity values are very different in the different domains present in the zipped ion-exchange membrane. In detail, domains with a low permittivity (for example, $\varepsilon \approx 2\text{-}3$) are formed in the "zip-zone", held together by the "donor-acceptor" bonds. On the other hand, any excess cation/anion functionalities form ionic domains characterized by high values of permittivity.

Thus, zipped ion-exchange membranes can be very good ion conductors.

In the case of a cation-conducting Z-IEM, in fact, the measured proton conductivity is typically slightly reduced compared to reference proton-conducting membranes, while the permeation to vanadium species can be almost completely blocked. As a result, the [H$^+$/V$^{n+}$] ion selectivity of the membrane is significantly enhanced.

Without wishing to be bound by theory, such behavior can be explained considering that the membrane of the disclosure exhibits two different types of domains. The ion-rich hydrophilic domains, where ion conductivity takes place, are reduced both in size and number with respect to those found in the pristine components. The reduced size results in a lower ion conductivity together with drastically lower permeability, since only small ions (e.g., H+) are allowed to percolate, while large ions (e.g., V$^{n+}$/VOm$^{n+}$) are sterically hindered and do not permeate. For example, in the VRFB application, high ion selectivity is essential for capacity maintenance, good cyclability, and extended retention time.

According to an embodiment of the present disclosure, preferably a small amount of a cation-exchange polyelectrolyte (e.g., Nafion) is crosslinked with an anion-exchange polyelectrolyte (e.g., the FAA-3 ionomer), it is expected that the hydrophilic domains of the latter system become smaller, following a similar mechanism as that described above. Another important aspect of the present disclosure is the possibility to blend the crosslinked polyelectrolyte(s) obtained as described above with one or more polymers that do not comprise any anion-exchange nor cation-exchange functionalities. In this case, the other polymers may affect: (i) the relaxations of the crosslinked polyelectrolyte (s), that typically play a crucial role to modulate the ion conduction mechanism; and (ii) the thermomechanical properties of the materials, that impact the mechanical and electrochemical stability. Similar effects can also be obtained by the introduction of suitable filler(s) in the Z-IEM.

Preferably, the at least one cation-exchange polyelectrolyte (CEP), of the ion-exchange membrane, is selected from polyelectrolytes comprising at least one functional group selected from: —SO$_3^-$; —CO$_2^-$; —PO$_3^-$; —ClO$_3^-$; —BrO$_2^-$.

Preferably, the at least one anion-exchange polyelectrolyte (AEP), of the ion-exchange membrane, is selected from polyelectrolytes comprising at least one functional group selected from: quaternary ammonium groups; guanidinium groups; amino groups; pyridine groups; imidazolium groups; phosphonium groups; other metal-based cationic groups.

Preferably, the Z-IEM also comprises at least one polymeric component that comprises neither cation-exchange nor anion-exchange functional groups. More preferably, the at least one polymeric component is selected from: polyvinylidene difluoride; polystyrene; polyvinyl alcohol; polyethylene glycol; polyacrylonitrile, polybenzimidazole.

According to an embodiment of the present disclosure, preferably the Z-IEM also comprises at least one filler. More preferably, the at least one filler is selected from: carbon black; carbon nanotubes or one of derivatives thereof; graphene or one of derivatives thereof.

According to an embodiment of the present disclosure, the at least one cation-exchange polyelectrolyte (CEP) crosslinked with at least one anion-exchange polyelectrolyte (AEP) are, preferably, crosslinked ion-exchange resins.

Another aspect of the present disclosure relates to a method for the preparation of the zipped ion-exchange membrane according to the description above, obtained by means of the following reaction:

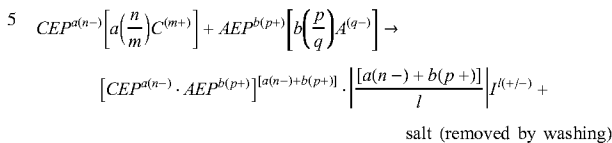

salt (removed by washing)

wherein:
(i) CEP is a cation-exchange polyelectrolyte, able to exchange C$^{(m+)}$ cations, itself bearing "a" anionic groups, each with a charge equal to "n-" elementary charges;
(ii) AEP is an anion-exchange polyelectrolyte, able to exchange A$^{(q-)}$ anions, itself bearing "b" cationic groups, each with a total charge equal to "p+" elementary charges;
(iii) "I$^{(+/-)}$" is the ion that can be exchanged;
(iv) the "salt" is obtained by the reaction of the cations and the anions provided by the starting CEP and AEP, respectively.

Another aspect of the present disclosure relates to a process for producing the zipped ion-exchange membrane according to the description above, comprising the steps of:
suspending or dissolving at least one cation-exchange polyelectrolyte (CEP) and at least one anion-exchange polyelectrolyte (AEP) in at least one solvent selected from: N,N-dimethylformamide (DMF); dimethylacetamide; 2-pyrrolidone (NMP); water; alcohols; ketones; aldehydes; carboxylic acids; amines; halogenated solvents; hydrocarbon solvents; preferably N,N-dimethylformamide (DMF); dimethylacetamide; 2-pyrrolidone (NMP);
casting the suspension/solution thus obtained;
under a controlled temperature, removing, through evaporation, the at least one solvent, thus obtaining the zipped ion-exchange membrane.

Preferably, in the above step of suspending or dissolving, a neutralisation reaction is carried out, thus obtaining a macromolecular salt.

The macromolecular salt thus obtained is a nanostructured and highly organised material. It exhibits synergic properties with respect to the starting components thereof.

Preferably, the above step of suspending or dissolving is a suspending step, with the formation of a colloidal suspension.

Preferably, zipped the ion-exchange membrane thus obtained further undergoes one or more of the following treatments:
treatment in one or more solutions, comprising water or other solvents dissolving either: (i) acid species; (ii) one or more base; (iii) one or more other ionic specie; (iv) one or more neutral specie;
thermomechanical treatments.

Preferably, the process is a bottom-up process.

Advantageously, in the resulting zipped ion-exchange membrane the molar fraction between electron "donor" and electron "acceptor" groups can be controlled and tailored for the intended application.

The Z-IEMs of the present disclosure are intended for application as separators in RFBs and FCs and are preferably prepared by means of the following reaction:

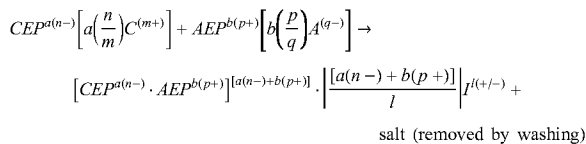

$$[CEP^{a(n-)} \cdot AEP^{b(p+)}]^{[a(n-)+b(p+)]} \cdot \left|\frac{[a(n-)+b(p+)]}{l}\right| I^{l(+/-)} +$$

salt (removed by washing)

wherein:

CEP is a cation-exchange polyelectrolyte, able to exchange $C^{(m+)}$ cations, itself bearing "a" anionic groups, each with a charge equal to "n−" elementary charges. Example: CEP→Nafion 1100; Nafion 1100 exchanges $H^+$ cations and bears —$SO_3^-$ anionic groups, each with a charge equal to "−1" elementary charges. Nafion includes one $H^+$ for each 1100 Dalton of molar mass.

AEP is an anion-exchange polyelectrolyte, able to exchange $A^{(q-)}$ anions, itself bearing "b" cationic groups, each with a total charge equal to "p+" elementary charges. Example: AEP→FAA-3 ionomer. FAA-3 ionomer exchanges Cl— anions and bears —$N(CH_3)_3^+$ cationic groups, each with a charge equal to "+1" elementary charges. FAA-3 ionomer includes one $Cl^-$ for each 370 Dalton of molar mass.

"$I^{l(+/-)}$" is the ion that can be exchanged by the obtained Z-IEM.

The "salt" is obtained by the reaction of the cations and the anions provided by the starting CEP and AEP, respectively.

It is pointed out that the total charge of the "salt" produced by the reaction between a CEP and an AEP is zero. Such "salt" is typically highly soluble in water, and it is removed from the final IEM by a series of washings. The charge of the ions "$I^{l(+/-)}$" left in the Z-IEM after the washings depends on the total amounts of positive and negative charge borne by the cations and the anions of the CEP and AEP used to carry out reaction. If "x" is the molar fraction of the positive charges in the starting CEP on all the charges included in the system, both positive and negative, then: (i) when x=0.5, neutralized membranes, that are highly dielectric, are obtained; when x>0.5, cation-conducting membranes are devised; when x<0.5, anion-conducting membranes are prepared instead.

According to a preferred embodiment, the preferred process used to produce the Z-IEMs of the present disclosure is "solvent-casting". Solvent-casting is widely described in the art, see for instance V. Di Noto et al., J. Power Sources 178 (2008) 561-574. Briefly, in the solvent-casting process, a suitable solvent is used to simultaneously dissolve/suspend homogeneously all the components to be included in the IEM (e.g., the crosslinked polyelectrolyte(s), the filler(s) and the polymers that do not comprise any anion-exchange nor cation-exchange functionalities). In a second step, this suspension/solution is cast, and the solvent is removed through evaporation at a controlled temperature. Typical solvents used for this purpose are high-boiling polar aprotic systems such as N,N-dimethylformamide (DMF) and 2-Pyrrolidone (NMP). It is also possible to obtain the final Z-IEMs by "doctor-blade" technique, starting from more viscous suspensions of the crosslinked polyelectrolytes including a lower amount of solvent(s). Many other techniques can be used to produce the Z-IEMs (e.g., spraying of the suspension on a hot plate, impregnation of suitable membranes with precursors followed by suitable treatments). One other possibility is to start with a "sponge" made up by macromolecules (e.g. Dowex®, Amberlite®, or Sephadex®) that is later infiltrated/swollen with other macroloecular component(s) and/or filler(s). This allows the adoption of ion-exchange resins, both pristine and crosslinked, in the Z-IEMs according to the present disclosure.

Of particular relevance for the purpose of this disclosure are the treatments that the Z-IEMs undergo after production. The latter typically consist of immersion in highly acidic (pH<2) or highly alkaline (pH>12) solutions, that are meant to extract from the Z-IEMs the "contamination" by ionic species. The latter "block" the "free" ion-exchange groups included in the system when x≠0.5, and jeopardize the conductivity. For instance, recast Nafion membranes may be contaminated by alkaline ions (e.g., $Na^+$, $K^+$), that give rise to ionic crosslinks and prevent the facile migration of $H_3O^+$ species. For this reason, Nafion-based IEMs are typically treated in aqueous $H_2SO_4$ solutions before use (see for instance: V. Di Noto et al., J. Power Sources 178 (2008) 561-574). In other instances, the IEMs are treated with solutions including a controlled concentration of ionic species that are meant to actually block the ion-exchange groups. One example is the neutralization of Nafion with amines (see for instance: V. Di Noto et al., J. Am. Chem. Soc. 132 (2010) 2183-2195). All these processes allow to modulate the volume density of crosslinked acid-base in the system, affecting both conductivity and the permselectivity of the Z-IEMs.

The density of the crosslinked acid-base and the other physicochemical properties of the Z-IEMs of the present disclosure can also be modulated by thermomechanical post-fabrication processes, that prominently include "hot-pressing" steps. Indeed, these processes are able to influence the domain structure of the Z-IEMs by the establishment of stabilized "crosslink interactions" between the macromolecules and/or the filler(s). The latter may reduce the size/affect the morphology of the hydrophilic domains, yielding effects similar to those associated with the interactions between anion-exchange and cation-exchange crosslinked polyelectrolytes.

BRIEF DESCRIPTION OF THE SCHEMES AND DRAWINGS

SCHEME 1. Neutral zipped ion-exchange membranes (Z-IEMs): a) trans out of plane Z-IEM (t-op-Z-IEM); b) mirror out of plane Z-IEM (m-op-Z-IEM); c) in plane-Z-IEM (ip-Z-IEP); and d) random-Z-IEM (r-Z-IEM). Conducting zipped ion-exchange membranes: e) Anion-conducting zipped IEM (A-t-op-Z-IEM); and Cation-conducting zipped IEM (C-t-op-Z-IEM).

FIG. 1. Permeability to $VO^{2+}$ species for the Z-IEM described in EXAMPLE 1 and the Nafion 212 "reference" membrane.

Figure 2:
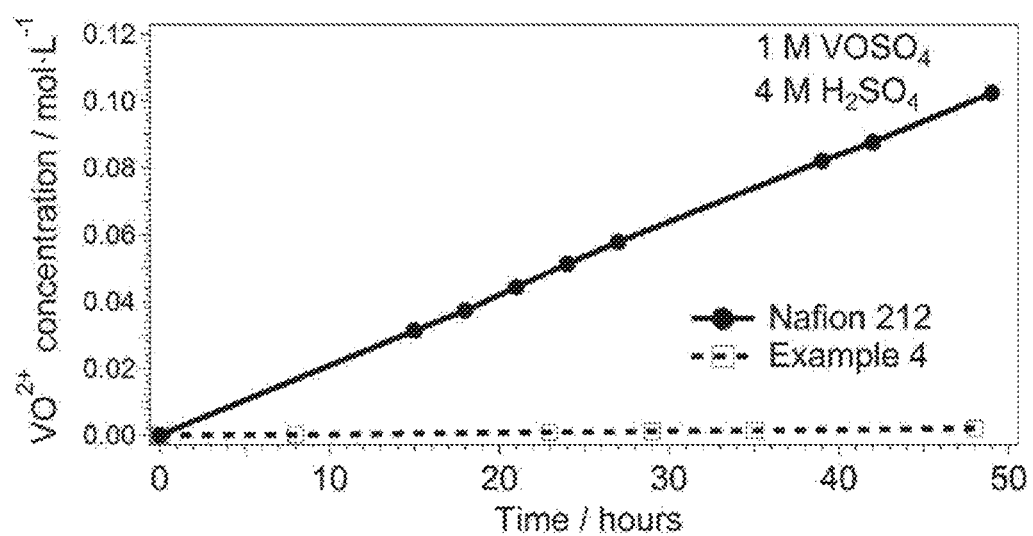

FIG. 2. Permeability to $VO^{2+}$ species for the Z-IEM described in EXAMPLE 4 and the Nafion 212 "reference" membrane.

Figure 3:
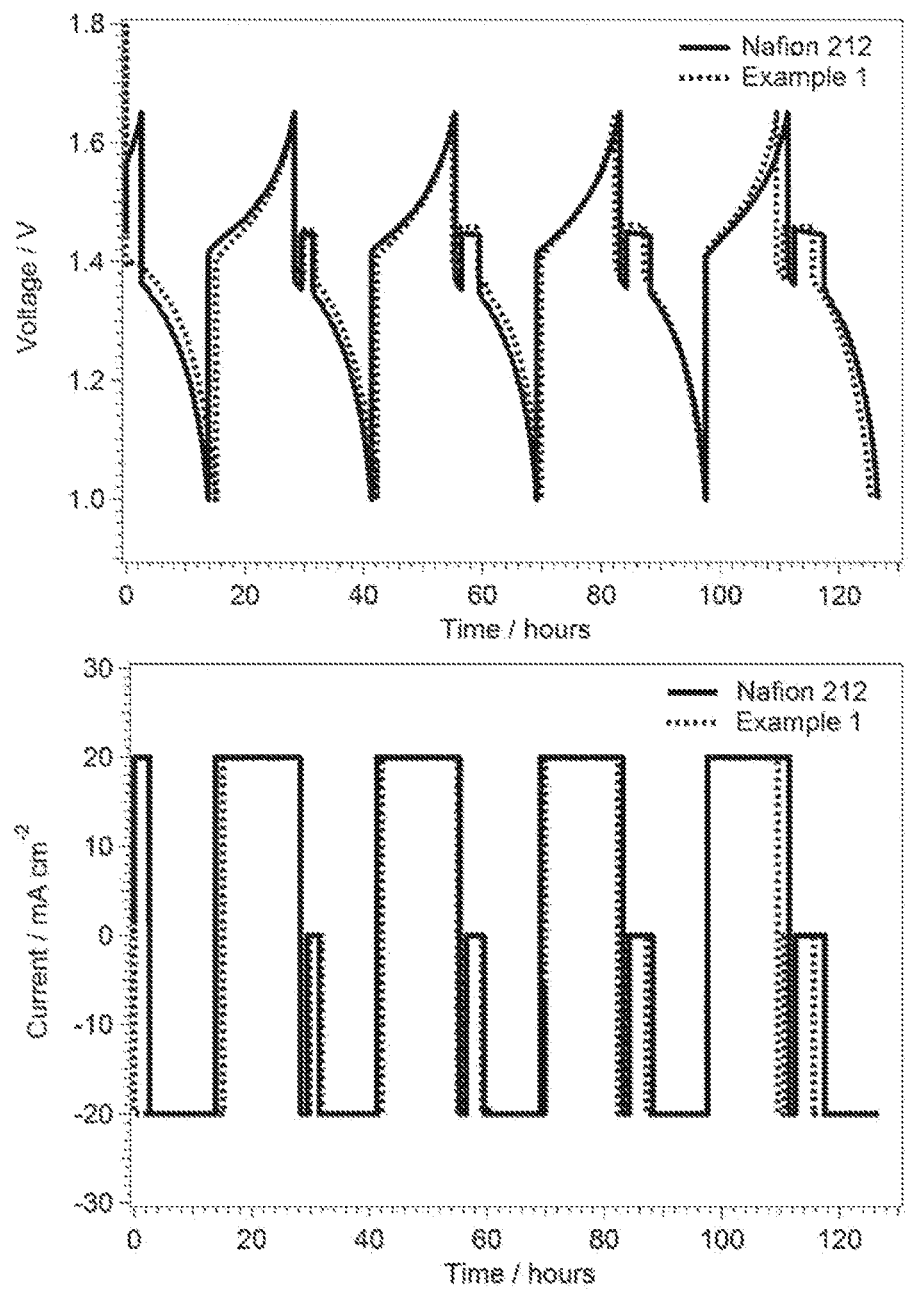

FIG. 3. Charge-discharge curves and measurement of OCV of VRFBs including the Z-IEM described in EXAMPLE 1 and the Nafion 212 "reference" membrane.

Figure 4:
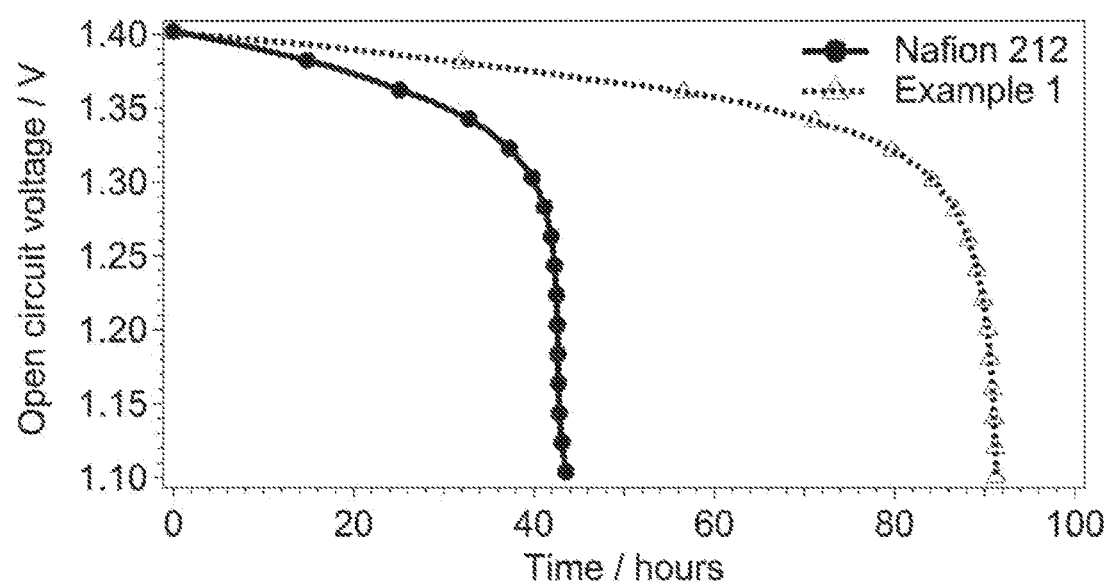

FIG. 4. Measurement of OCV of VRFBs including the Z-IEM described in EXAMPLE 1 and the Nafion 212 "reference" membrane.

Figure 5:
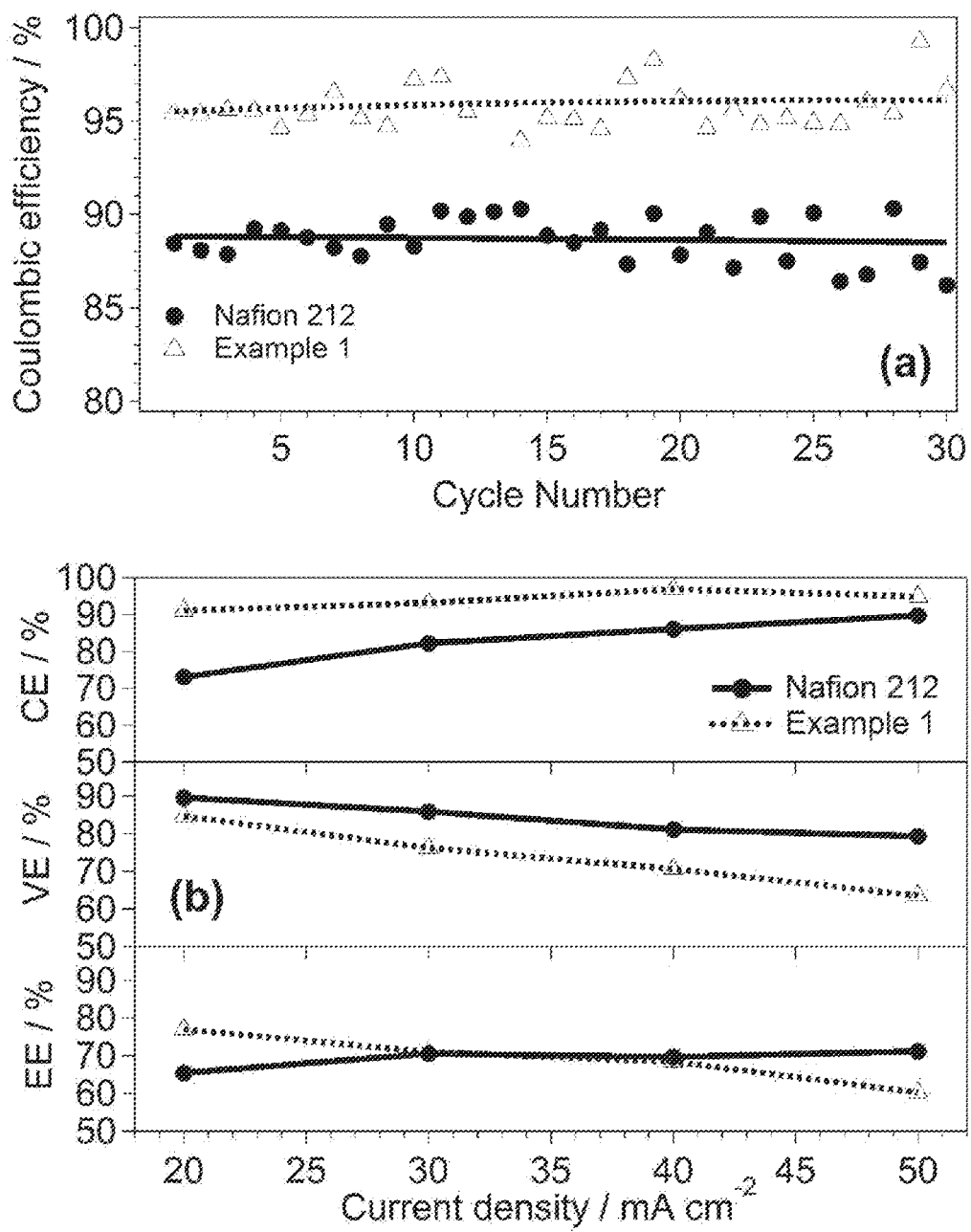

FIG. 5. Coulombic efficiencies at 40 mA·cm$^{-2}$ over 30 cycles for EXAMPLE 1 and Nafion 212 membranes (a). Coulombic efficiency (CE), voltage efficiency (VE) and energy efficiency (EE) of VRFBs assembled with Nafion 212 and EXAMPLE 1 Z-IEM, as the current density of charge/discharge is varied from 20 to 50 mA·cm$^{-2}$ (b).

Figure 6:
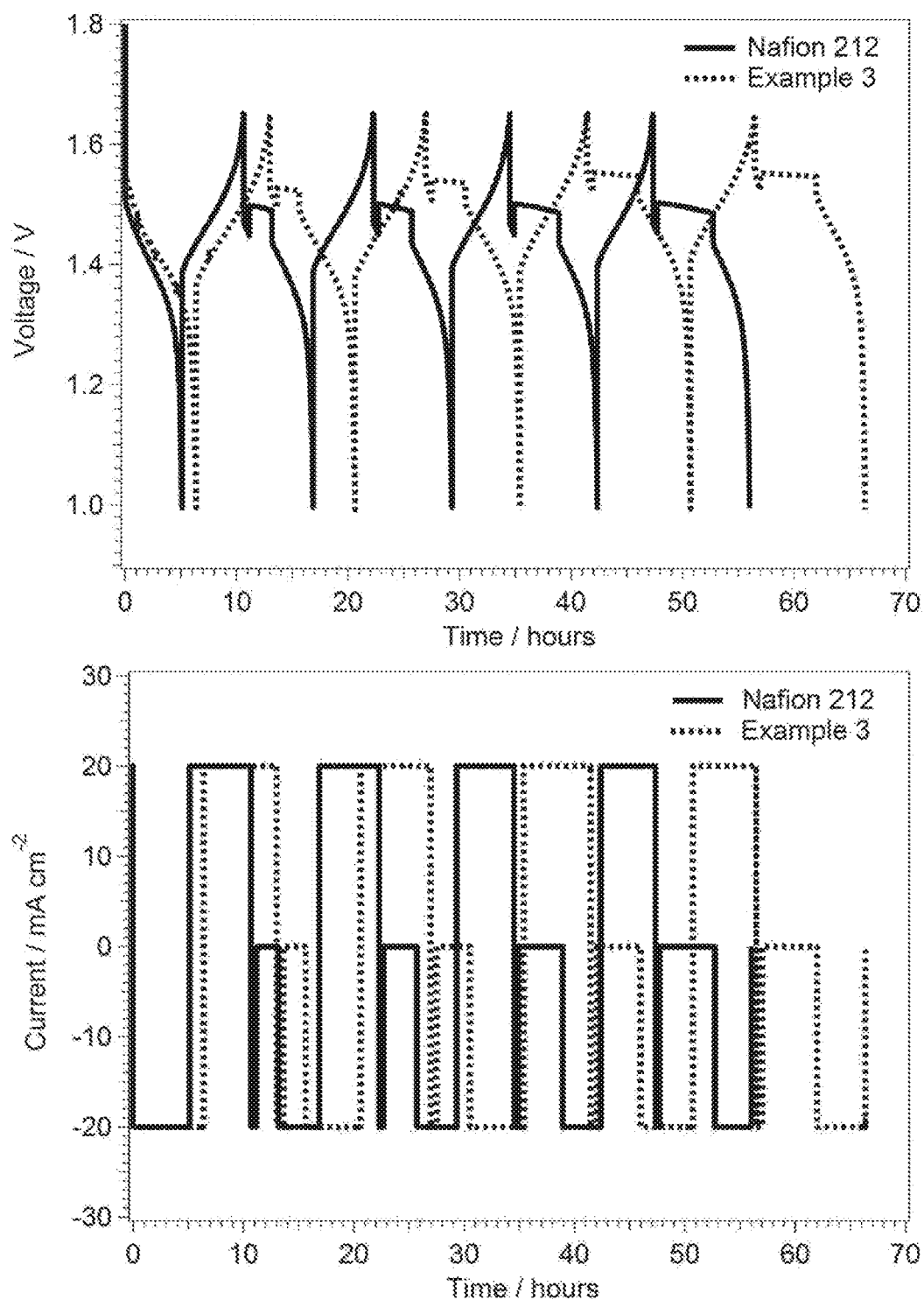

FIG. 6. Charge-discharge curves and measurement of OCV of VRFBs including the Z-IEM described in EXAMPLE 3 and the Nafion 212 "reference" membrane.

Figure 7:
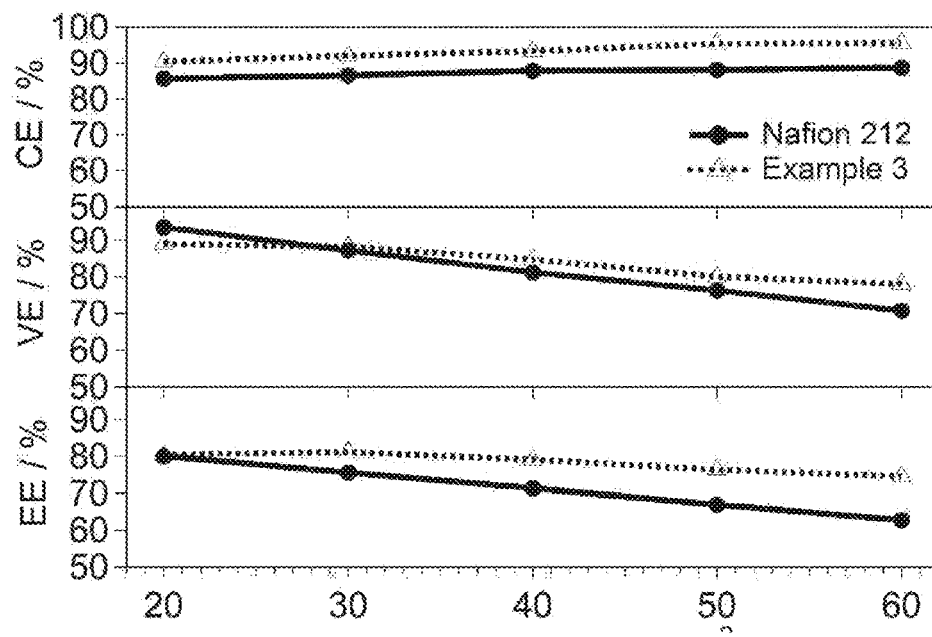

FIG. 7. Coulombic efficiency (CE), voltage efficiency (VE) and energy efficiency (EE) of VRFBs assembled with Nafion 212 and EXAMPLE 3 Z-IEM, as charge/discharge current density is varied from 20 to 60 mA·cm$^{-2}$.

Figure 8:
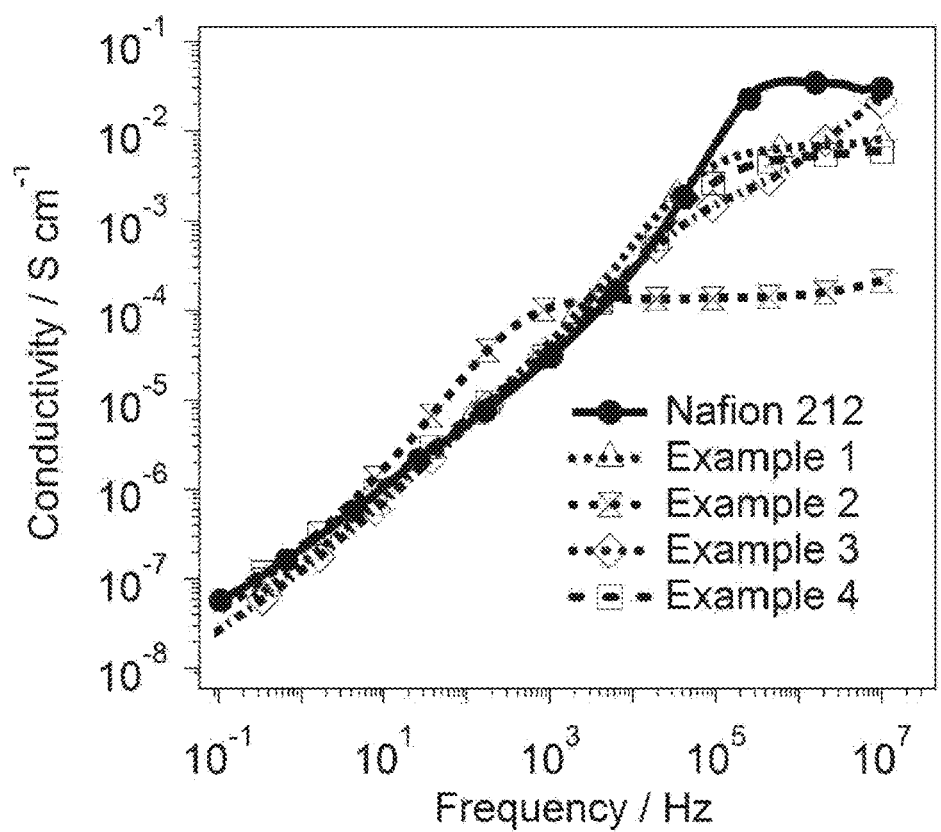

FIG. 8. BES results of the Z-IEMs obtained as described in EXAMPLE 1—EXAMPLE 4 and of the Nafion 212 "reference" membrane.

DETAILED DESCRIPTION OF THE DRAWINGS

In the zipped ion-exchange membrane (Z-IEM) according to the present disclosure, the at least one cation-exchange polyelectrolyte (CEP) has a molar fraction of positive charges (x) so that:
  (i) when x=0.5, Z-IEM is a completely neutralized ion-exchange membrane;
  (ii) when x>0.5, Z-IEM is a cation-conducting ion-exchange membrane;
  (iii) when x<0.5, Z-IEM is an anion-conducting ion-exchange membrane.

In a particular aspect of the disclosure (for x>0.5), the ionic specie that is able to migrate through the membrane is $H_3O^+$. In another particular aspect of the disclosure (for x<0.5), the ionic specie that is able to migrate through the membrane is $OH^-$. In yet another particular aspect of the present disclosure (for x<0.5), the ionic specie that is able to migrate through the membrane is a halide such as $F^-$, $Cl^-$, $Br^-$ or $I^-$. The Z-IEMs according to the present disclosure block the migration of ionic species different than those they are designed to be permeable to.

The Z-IEMs according to the present disclosure include crosslinked acid-base, such crosslinks are obtained by the reaction of: (i) a cation-exchange functional group; and (ii) an anion-exchange functional group. Cation-exchange functional groups preferably include, but are not limited to: $—SO_3^-$; $—CO_2^-$; $—PO_3^-$; $—ClO_3^-$; $—BrO_2^-$. Anion-exchange functional groups preferably include, but are not limited to: quaternary ammonium groups; guanidinium groups; amino groups; pyridine groups; imidazolium groups; phosphonium groups; other metal-based cationic groups, e.g., including a Ru center coordinated by polypyridines.

In a typical embodiment of the above process for the establishment of crosslinks, the CEP is Nafion and the AEP is the FAA-3 ionomer. In this embodiment, provided for illustrative purposes, the process is a "Zip" reaction where some fraction of the $—SO_3^-$ groups of the former CEP (Nafion) will establish acid-base crosslinks, like a "Zip fastening" with the $—N(CH_3)_3^+$ groups of the latter AEP (FAA-3 ionomer). Such "Zip fastening" is typical of the Z-IEM of the present disclosure.

The Z-IEMs according to the present disclosure preferably comprise a polymeric matrix, that includes at least two crosslinked macromolecular components. In a particular aspect of this disclosure, the anion-exchange polyelectrolyte is preferably the FAA-3 ionomer. In another particular aspect of this disclosure, the cation-exchange polyelectrolyte is preferably Nafion 1100; in yet another particular aspect of this disclosure, the cation-exchange polyelectrolyte is preferably Nafion, whose equivalent weight is different from 1100, but preferably ranges between 600 and 1200. In yet other particular aspects of this disclosure, the cation-exchange polyelectrolyte is preferably Aquivion. In another particular aspect of this disclosure, the cation-exchange polyelectrolyte is preferably sulfonated polyetherether sulfone or polyetheretherketone. In one particular aspect of the present disclosure, the polymeric matrix preferably includes one cation-exchange polyelectrolyte and one anion-exchange polyelectrolyte. In another particular aspect of the present disclosure, the polymeric matrix preferably includes one or more cation-exchange polyelectrolyte and one or more anion-exchange polyelectrolyte. In one particular aspect of the present disclosure, the crosslinked polyelectrolyte(s) are, preferably, further blended with one or more macromolecules, that include, but are not limited to: polyvinylidene difluoride; polystyrene; polyvinyl alcohol; polyethylene glycol; polyacrylonitrile, polybenzimidazole. In a particular aspect of the present disclosure, the crosslinked polyelectrolyte(s) comprised in the matrix of the Z-IEM are preferably crosslinked ion-exchange resins. In yet another particular aspect of the present disclosure, the crosslinked polymeric component(s) are preferably infiltrated/swollen into a crosslinked macromolecular "sponge". In another particular aspect of this disclosure, the macromolecular "sponge" is preferably made of resins such as Dowex®, Amberlite®, or Sephadex®. In a particular aspect of the present disclosure, the Z-IEM also includes, preferably, one or more filler. The grain size of the filler(s) introduced in the Z-IEMs preferably ranges between 3 nm and 30000 nm, more preferably between 5 nm and 50 nm. The overall ion-exchange capacity (IEC) of the Z-IEMs according to the present disclosure preferably ranges between 0.5 meq/g and 2 meq/g.

In one particular aspect of the present disclosure, the filler is preferably one or more carbon-based species, including: (i) carbon black; (ii) carbon nanotubes (both single-walled or multi-walled) or one of their derivatives; (iii) graphene (both single-layer and multi-layer) or one of its derivatives (e.g., graphene oxide, highly defective graphene supported on inorganic nanoparticles). In one particular aspect of the present disclosure, the filler preferably consists of ceramic oxoclusters whose surface is functionalized with perfluorocarbon chains. In one particular aspect of the present disclosure, the filler preferably consists of 2D materials such as: (i) $MoS_2$ or one of its derivatives; (ii) other transition metal dichalcogenides including, but not limited to: $WS_2$, $MoSe_2$, $WSe_2$, $MoTe_2$; and (iii) boron nitride sheets or germanane.

In the present disclosure, the components of the polymeric matrix of the Z-IEMs are preferably electrostatically cross-linked. In a particular aspect of the present disclosure, the components of the crosslinked polymeric matrix are dissolved in the same solvent; the product then undergoes a "solvent casting" process to obtain the Z-IEM. In a particular aspect of the present disclosure, the solvent used during the "solvent casting" process is preferably one or more of: (i) N,N-dimethylformamide (DMF); (ii) dimethylacetamide; and (iii) 2-Pyrrolidone (NMP). Other solvents are used in other aspects of the present disclosure, on the condition that all the macromolecular components used in the matrix of the Z-IEM are simultaneously soluble in such solvents. In other aspects of the present disclosure, the solution preferably including the macromolecular components of the Z-IEM is also added with one or more fillers. Preferably, the filler constitutes 10 wt % or lower than that of the overall Z-IEM. Such fluid component, that may or may not include the filler(s), can be also infiltrated/swollen into a crosslinked macromolecular system, that may or may not include anion-exchange functional groups, cation-exchange functional groups, or both. In yet another particular aspect of the present disclosure, the fluid component that may or may not include the filler (s), can be sprayed on a hot plate, yielding the Z-IEM. In another particular aspect of the present disclosure, the Z-IEM is preferably obtained spraying in succession on a hot plate different fluid component(s), that may or may not include the filler(s). This allows for the preparation of multi-layered Z-IEMs with a well-controlled composition along the cross-section.

The solvent(s) included in the final membranes is preferably removed by one or more of: (i) evaporation at a T>30° C., preferably higher than T>80° C.; (ii) evaporation at reduced pressure, preferably at P<100 Pa (1 mbar); and (iii) extraction by immersion in a liquid phase, that includes but is not limited to solvents such as water, methanol, ethanol, isopropyl alcohol, acetone, toluene, hexane, benzene.

In particular aspects of the present disclosure, the Z-IEMs can, preferably, also undergo one or more of the following "post-fabrication" treatments:

Treatment in one or more solutions, comprising water or other solvents (including, but not limited to methanol, ethanol, isopropyl alcohol, acetone, toluene, hexane, benzene) dissolving either: (i) acid species, including but not limited to one or more mineral acids (e.g., $H_2SO_4$, HCl, $HNO_3$, $H_3PO_4$, $HClO_4$); one or more organic acid (e.g., acetic acid, formic acid, maleic acid); (ii) one or more base (e.g., LiOH, KOH, NaOH, RbOH, CsOH, pyridine, $NH_3$, amines,); (iii) one or more other ionic specie (e.g., anions such as $F^-$, $BF_4^-$, $Cl^-$, $ClO^-$, $ClO_2^-$, $ClO_3^-$, $ClO_4^-$, $Br^-$, $Br_3^-$, $I^-$, $I_3^-$ and others; cations such as $V^{2+}$, $V^{3+}$, $VO2+$, $VO^{2+}$, $Fe^{2+}$, $Fe^{3+}$, $Cr^{2+}$, $Cr^{3+}$, $Ce^{3+}$, $Ce^{4+}$, $Ti^{3+}$, $Ti^{4+}$, $Mn^{2+}$, $Mn^{3+}$, $Zn^{2+}$, $Pb^{2+}$, $Np^{3+}$, $Np^{4+}$, $NpO_2^{2+}$, $NpO_2^+$, $Li^+$, $Na^+$, $K^+$, $Rb^+$, $Cs^+$, $Mg^{2+}$, $Ca^{2+}$, $Sr^{2+}$, $Ba^{2+}$, $MnO_4+$ and others); (iv) one or more neutral specie (e.g., hydrogen peroxide, other organic or inorganic peroxides such as $Na_2O_2$ and $K_2O_2$). Each of these treatments is preferably carried out at 20° C.<T<90° C., at 1 atm<P<10 atm, and lasts preferably between 10 min to 2 hours.

Thermomechanical treatments, where the Z-IEM is taken to one or more different steps, each lasting preferably between 1 minute to 10 minutes, at a temperature ranging preferably between 20° C. and 200° C. and a pressure ranging preferably between 0.69 MPa (100 psig) and 34.47 MPa (5000 psig).

The following examples are provided for illustrative purposes of the present disclosure and are not to be understood as limiting the scope of protection defined by the claims.

Example 1

10 mL of 5 wt % dispersion of Nafion ionomer with an ion-exchange capacity (IEC) of 0.92 meq·$g^{-1}$ was used. The solvent was removed from the 5 wt % Nafion dispersion by heating at 80° C. until a thin film was obtained. The film is then re-dissolved in 10 mL DMF at room temperature under vigorous stirring, that lasted for 2 h; the resulting solution was clear, and it was labelled "A". 0.039 g of the FAA-3 ionomer in the brominated form ware dissolved into 3 mL of DMF. This process was carried out at room temperature under vigorous stirring, that lasted for 1 h; the product was a clear solution, labeled "B". B is added dropwise into A, that was kept under vigorous stirring for 3 h at room temperature.

The obtained solution underwent a solvent-casting process in a Petri dish, that was kept at 80° C. for 16 hours in a ventilated oven. The resulting Z-IEM was then dislodged from the Petri dish after immersion in hot bidistilled water (T=60° C.). The Z-IEM was then immersed into 1 M $H_2SO_4$ for 24 h at room temperature. The Z-IEM was then thoroughly washed with bidistilled water to remove the excess acid. Finally, the Z-IEM underwent two treatments in bidistilled water, each lasting two hours. The final wet Z-IEM had a diameter of 9 cm, and a thickness of 50 μm (50 microns); the overall IEC of the cation-conducting Z-IEM was 0.67 meq·$g^{-1}$.

Example 2

4.5 mL of 5 wt % dispersion of Nafion ionomer with an IEC of 0.92 meq·$g^{-1}$ was used. The solvent was removed from the 5 wt % Nafion dispersion by heating at 80° C. until a thin film is obtained. The film was then dissolved in 5 mL DMF at room temperature under vigorous stirring, that lasted for 2 h; the resulting solution was clear, and it was labelled "A". 0.3 g of the FAA-3 ionomer in the brominated form were dissolved into 5 mL of DMF. This process was carried out at room temperature under vigorous stirring, that lasts for 1 h; the product was a clear solution, labeled "B". A was added dropwise into B, that was kept under vigorous stirring for 3 h at room temperature. The obtained mixture underwent a solvent-casting process in a Petri dish, that was kept at 80° C. for 16 hours in a ventilated oven. The resulting Z-IEM was then dislodged from the Petri dish after immersion in bidistilled water (T=25° C.).

The Z-IEM was treated three times with a 1 M solution of KBr at room temperature, and finally treated twice at room temperature with bidistilled water. The final wet Z-IEM had a diameter of 9 cm, and a thickness of 50 μm (50 microns); the overall IEC of the anion-conducting Z-IEM was equal to 0.83 meq·$g^{-1}$.

Example 3

SPEEK was prepared as described in the literature (see for instance V. Di Noto et al., J. Membr. Sci. 390-391 (2012) 58-67). The obtained SPEEK had a sulfonation degree of 55%, corresponding to an IEC of 1.6 meq·$g^{-1}$. 0.35 g of SPEEK were dissolved into 5 mL of DMF at room temperature under vigorous stirring, that lasted for 2 h; the resulting solution was clear, and it was labelled "A". 0.015 g of FAA-3 ionomer in the brominated form were dissolved into 3 mL of DMF. This process was carried out at room temperature under vigorous stirring, that lasted for 1 h; the product was a clear solution, labeled "B". B was added dropwise into A, that was kept under vigorous stirring at room temperature. The resulting mixture was stirred for 3 h; after this process a very fine whitish precipitate was formed, that was removed by filtration. The filtrate then underwent a solvent-casting process in a Petri dish, that was kept at 80° C. for 16 hours in a ventilated oven. The resulting Z-IEM was then dislodged from the Petri dish after immersion in hot bidistilled water (T=60° C.). The Z-IEM was then immersed into 1 M $H_2SO_4$ for 24 h at room temperature. The Z-IEM was then thoroughly washed with bidistilled water to remove the excess acid. Finally, the Z-IEM underwent two treatments in bidistilled water, each lasting two hours. The final wet Z-IEM had a diameter of 9 cm, and a thickness of 60 μm (60 microns); the overall IEC of the cation-conducting Z-IEM was equal to 1.45 meq·$g^{-1}$.

Example 4

10 mL of a 5 wt % dispersion of Nafion ionomer with an IEC of 0.92 meq·$g^{-1}$ was used. The solvent was removed from the 5 wt % Nafion dispersion by heating at 80° C. until a thin film was obtained. The film was then dissolved in 10 mL DMF at room temperature under vigorous stirring, that lasted for 2 h; the resulting solution was clear, and it was labelled "A". 0.039 g of FAA-3 ionomer in the brominated form were dissolved into 3 mL of DMF. This process was carried out at room temperature under vigorous stirring, that lasted for 1 h; the product was a clear solution, labeled "B". 0.118 g of $WO_3$ nanopowders (Ø=100 nm) were added into 5 mL of DMF and treated in an ultrasonic bath for 2 h, yielding a homogenous dispersion, labeled "C". B and C were added dropwise into A, that was kept under vigorous stirring for 3 h at room temperature. The obtained mixture underwent a solvent-casting process in a Petri dish, that was kept at 80° C. for 16 hours in a ventilated oven. The resulting Z-IEM was then dislodged from the Petri dish after immersion in hot bidistilled water (T=60° C.).

The Z-IEM was then immersed into 1 M $H_2SO_4$ for 24 h at room temperature. The Z-IEM was then thoroughly washed with bidistilled water to remove the excess acid. Finally, the Z-IEM underwent two treatments in bidistilled water, each lasting two hours. The final wet Z-IEM had a diameter of 9 cm, and a thickness of 60 μm (60 microns); the overall IEC of the cation-conducting Z-IEM was equal to 0.67 meq·$g^{-1}$.

Example 5 (COMPARATIVE)

The permeability to vanadium species of the proposed Z-IEMs was measured by UV-Vis spectrometry through a conventional diffusion cell, as described for instance in V. Di Noto et al., Solid State Ionics 319 (2018) 110-116. The effective area of the sample membrane is 3 $cm^2$. One reservoir was filled with solution consisting of 1 M $VOSO_4$ dissolved in 4 M $H_2SO_4$ solution, while the other reservoir (the blank) was filled with a solution of 5 M $H_2SO_4$. In another experiment, one reservoir was filled with 2 M $VOSO_4$ in 5 M HCl, while the other was filled with 2 M $H_2SO_4$ and 5 M HCl. The diffusion cell was left to rest at room temperature, with both halves kept under constant stirring. 1 mL aliquots were taken from both halves of the diffusion cell every few hours. The aliquots taken from the blank cell were then tested for vanadium content by means of UV-Vis spectroscopy without diluting the samples. The results of these experiments were reported in FIG. 1. It was clear that the permeability to vanadium species of EXAMPLE 1 Z-IEM was dramatically inferior than that of Nafion 212 "reference" membrane in both media.

A similar test was also carried out on the Z-IEM obtained as described in EXAMPLE 4. The vanadium solution consisted of 1 M $VOSO_4$ in 4 M $H_2SO_4$, while the blank was filled with a solution of 5 M $H_2SO_4$. Results were shown in FIG. 2. It was clear that the permeability to vanadium species of EXAMPLE 4 Z-IEM was dramatically inferior that of Nafion 212 "reference" membrane.

VRFB testing was carried out using a zero-gap cell configuration. The single-cell VRFB was assembled by sandwiching the Z-IEM between two carbon paper electrodes (thickness of 0.25 mm, AvCarb P75), which were thermally treated at 400° C. under airflow. The area of the electrodes was 5 $cm^2$. The vanadium (IV) electrolyte solutions were prepared by dissolving $VOSO_4$ in diluted sulfuric acid. Electrolytes comprising 80 mL of 1.0 M $VO_2^+$ and 80 mL of 1.0 M $V^{2+}$ in 5.0 M total sulfate solution were prepared by a two-step electrochemical charging method as described elsewhere (see for instance A. M. Pezeshki et al., J. Power Sources 294 (2015) 333-338). Each vanadium solution was pumped into the corresponding half-cell at a constant flow rate of 20 mL·$min^{-1}$. Both tanks of electrolyte were bubbled with nitrogen. The temperature of the whole VRFB system was kept constant at 30° C.

The Z-IEMs were pre-conditioned in 5.0 M sulfuric acid for at least 24 h. The Z-IEM obtained as described in EXAMPLE 1 was hot-pressed at 6.89 MPa (1000 psig) at 80° C. for 7 minutes before assembly in a VRFB. The charge-discharge process was carried out at 20 mA·$cm^{-2}$ with cut-off voltages set at 1.65 and 1.00 V. the open-circuit voltage (OCV) was measured during the discharge process after reaching a state of charge (SOC) equal to 90% for 2 h, 3 h, 4 h and 5 h. Results were reported in FIG. 3. The observed self-discharging arose as a result of vanadium ions crossover. In comparison with the Nafion 212 "reference" membrane, the self-discharging of the Z-IEM devised in EXAMPLE 1 was significantly lower. Indeed, in the case of Nafion 212 "reference" membrane, the OCV decreased by 10 mV over 5 hours, while in the same timespan the OCV of the Z-IEM devised in EXAMPLE 1 decreased by less than 1 mV, indicating a much lower crossover of vanadium ions.

The measurement of the self-discharge of the VRFBs shown above, and tested in the conditions described above after reaching a state of charge (SOC) equal to 80% was also carried out for longer periods of time. The test was interrupted once the OCV fell below 1.10 V. Results were shown in FIG. 4. The self-discharge of EXAMPLE 1 Z-IEM was much inferior in comparison with that revealed by Nafion 212 "reference" membrane. Accordingly, it was demonstrated that the permeability to vanadium ions of EXAMPLE 1 Z-IEM was much inferior than that of the Nafion 212 "reference" membrane.

The cycle life of the VRFB was determined at a constant current density of 40 mA·$cm^{-2}$ for 30 cycles. The energy efficiency (EE), coulombic efficiency (CE) and voltage efficiency (VE) were evaluated as reported in the previous art; see for instance J. Xi et al., J. Power Sources 166 (2007) 531-536. Results were shown in FIG. 5. The Z-IEM described in EXAMPLE 1 demonstrated higher CE than Nafion 212 "reference" membrane at all measured current densities.

Two further VRFBs were fabricated; the former includes the Z-IEM obtained in EXAMPLE 3, while the latter mounts the Nafion 212 "reference" membrane. The membranes were tested as described above for the VRFBs mounting the Z-IEM obtained as described in EXAMPLE 1. The volume of the electrolyte was equal to 25 mL per tank. Results were reported in FIG. 6. The observed self-discharging arose as a result of vanadium ions crossover. In comparison with the Nafion 212 "reference" membrane, the self-discharging of the Z-IEM devised in EXAMPLE 3 was significantly lower. Indeed, in the case of Nafion 212 "reference" membrane, the OCV decreases by 17 mV over 5 hours, while in the same timespan the OCV of the IEM devised in EXAMPLE 3 decreased by less than 7 mV, indicating a much lower crossover of vanadium ions.

The energy efficiency (EE), coulombic efficiency (CE) and voltage efficiency (VE) were also determined between 20 and 60 mA·$cm^{-2}$. Results were reported in FIG. 7. The Z-IEM described in EXAMPLE 3 demonstrated higher CE and EE than the Nafion 212 "reference" membrane at all measured current densities.

Swelling tests were carried out by immersing a square sample of the Z-IEM devised in EXAMPLE 2 in acetonitrile. The length and width of the EXAMPLE 2 Z-IEM are checked by every 24 hours. Over the course of one week, the swelling of EXAMPLE 2 Z-IEM was negligible. In comparison, the swelling of a "reference" membrane obtained by recasting the FAA-3 ionomer was significant, on the order of 30%.

The ionic conductivity of each Z-IEM was measured by Broadband Electrical Spectroscopy (BES) as reported elsewhere; see for instance V. Di Noto et al., Solid State Ionics 319 (2018) 110-116. BES was conducted at a frequency range of between 30 mHz and 10 MHz at room temperature. BES studies were carried out on completely hydrated samples. Results were shown on FIG. 8.

The results shown in FIG. 8 were used to evaluate the ionic conductivity of the Z-IEMs. Results were reported in TABLE 1, that also includes the permeability and the selectivity results.

TABLE 1

Ion conductivity ($\sigma$), permeability to $VO^{2+}$ species (P) and ion selectivity of the Nafion 212 "reference" membrane and of the Z-IEMs according to the present disclosure.

| Membrane | Type of conductivity | $\sigma$/S cm$^{-1}$ | P/cm$^2 \cdot$ min$^{-1}$ | Ion selectivity/ S $\cdot$ min $\cdot$ cm$^{-3}$ |
|---|---|---|---|---|
| Nafion 212[a] | Cation (H$_3$O+)$_n$ | $3.5 \cdot 10^{-2}$ | $3.3 \cdot 10^{-6}$ | $1.1 \cdot 10^4$ |
| Example 1 | Cation (H$_3$O+)$_n$ | $6.7 \cdot 10^{-3}$ | $3.7 \cdot 10^{-9}$ | $1.8 \cdot 10^6$ |
| Example 2 | Anion (Br$^-$) | $1.5 \cdot 10^{-4}$ | — | — |
| Example 3 | Cation (H$_3$O+)$_n$ | $4.8 \cdot 10^{-3}$ | — | — |
| Example 4 | Cation (H$_3$O+)$_n$ | $5.1 \cdot 10^{-3}$ | $6.0 \cdot 10^{-8}$ | $8.5 \cdot 10^4$ |
| Nafion 212[b, c] | Cation (H$_3$O+)$_n$ | $6.0 \cdot 10^{-2[b]}$ | $2.1 \cdot 10^{-6[c]}$ | $2.9 \cdot 10^4$ |

[a]Measured "in house".
[b]B. P. Gindt et al., J Mater Chem A 4 (2016) 4288-4295.
[c]C. N. Sun et al., Electrochem. Commun. 43 (2014) 63-66.

Results indicated clearly that the conductivity of the proton-conducting Z-IEMs devised in this disclosure (e.g., as described in EXAMPLE 1, EXAMPLE 3 and EXAMPLE 4) was ca. one order of magnitude lower than that of the Nafion 212 "reference" membrane. On the other hand, the permeability to vanadium species of the same Z-IEMs was ca. two to three orders of magnitude lower. As a result, in comparison with the Nafion 212 "reference" membrane, the proton-conducting Z-IEMs devised in this disclosure exhibited a selectivity that was one-two orders of magnitude larger. The anion conductivity of the Z-IEM according to the present disclosure (e.g., as described in EXAMPLE 2) was also promising.

Example 6

The Z-IEM was obtained following exactly the same procedure described in EXAMPLE 1. The difference was that the solution labeled "B" included 3 mL of DMF dissolving 0.04 g of the [PVBTMA][Br]-b-[PMB] ionomer (IEC=2), that was synthesized by the method described in the literature (see: K. Vezzù et al., J. Am. Chem. Soc. 140 (2018) 1372-1384). The overall IEC of the cation-conducting Z-IEM was equal to 0.68 meq·g$^{-1}$.

Example 7

The Z-IEM was obtained following exactly the same procedure described in EXAMPLE 1. The difference was that the solution labeled "B" included 3 mL of DMF dissolving 0.039 g of the 4MPyr-FPK(I) ionomer (IEC=2.3 meq·g$^{-1}$, x/y=0.51), that was synthesized by the method described in the literature (see: G. Nawn et al., Adv. Funct. Mater. 28 (2018) 1706522). The overall IEC of the cation-conducting Z-IEM was equal to 0.67 meq·g$^{-1}$.

Example 8

The Z-IEM was obtained starting from a membrane made of Dowex® with IEC=0.7 meq·g$^{-1}$ and a cross-linkage of 2%, whose weight was 0.5 g. The Z-IEM was swollen for 24 h at room temperature with a solution of 3 mL of DMF dissolving 0.05 g of Nafion (IEC=0.92 meq·g$^{-1}$). The product was then placed into a ventilated oven for 16 h at 80° C., and was later treated three times with a 0.5 M KOH solution. The Z-IEM was then treated twice with bidistilled water for 1 h. The IEC of the resulting anion-conducting Z-IEM was 0.55 meq·g$^{-1}$.

Example 9

8 mL of a 6 wt % dispersion of Aquivion ionomer with an IEC of 1.2 meq·g$^{-1}$ and a density of 0.875 g/cm$^3$ was used. The solvent was removed from the Aquivion dispersion by heating at 80° C. until a thin film was obtained. The film was then dissolved in 10 mL DMF at room temperature under vigorous stirring, that lasted for 2 h; the resulting solution was clear, and it was labelled "A". 0.08 g of the FAA-3 ionomer in the brominated form were dissolved into 3 mL of DMF. This process was carried out at room temperature under vigorous stirring, that lasted for 1 h; the product was a clear solution, labeled "B". B was added dropwise into A, that was kept under vigorous stirring for 3 h at room temperature. The obtained mixture underwent a solvent-casting process in a Petri dish, that was kept at 80° C. for 16 hours in a ventilated oven. The resulting Z-IEM was then dislodged from the Petri dish after immersion in hot bidistilled water (T=60° C.). The Z-IEM was then immersed into 1 M H$_2$SO$_4$ for 24 h at room temperature. The IEM was then thoroughly washed with bidistilled water to remove the excess acid. Finally, the Z-IEM underwent two treatments in bidistilled water, each lasting two hours. The final wet Z-IEM had a diameter of 9 cm and a thickness of 60 μm (60 microns); the overall IEC of the cation-conducting Z-IEM was equal to 0.69 meq·g$^{-1}$.

Example 10

The Z-IEM was obtained following exactly the same procedure described in EXAMPLE 9. The difference was that the solution labeled "B" includes 3 mL of DMF dissolving 0.08 g of the [PVBTMA][Br]-b-[PMB] ionomer (IEC=2 meq·g$^{-1}$), that was synthesized by the method described in the literature (see: K. Vezzù et al., J. Am. Chem.

Soc. 140 (2018) 1372-1384). The overall IEC of the cation-conducting Z-IEM was equal to 0.69 meq·g$^{-1}$.

Example 11

The Z-IEM was obtained following exactly the same procedure described in EXAMPLE 1. The difference was that 0.05 g of fumed silica nanopowders (∅=7 nm) were added into 5 mL of DMF and treated in an ultrasonic bath for 2 h, yielding a homogenous dispersion, labeled "C". Solution B (see EXAMPLE 1) and C were added dropwise into A (see EXAMPLE 1). The remaining steps of the preparation of the Z-IEM were the same as those described in EXAMPLE 1. The overall IEC of the cation-conducting Z-IEM was equal to 0.66 meq·g$^{-1}$.

Example 12

The Z-IEM was obtained following exactly the same procedure described in EXAMPLE 1. The difference was that 0.026 g of HfO$_2$ nanopowders (∅=100 nm) were added into 5 mL of DMF and treated in an ultrasonic bath for 2 h, yielding a homogenous dispersion, labeled "C". Solution B (see EXAMPLE 1) and C were added dropwise into A (see EXAMPLE 1). The remaining steps of the preparation of the Z-IEM were the same as those described in EXAMPLE 1. The overall IEC of the cation-conducting Z-IEM was equal to 0.64 meq·g$^{-1}$.

Example 13

The Z-IEM was obtained following exactly the same procedure described in EXAMPLE 1. The difference was that 0.026 g of (ZrO$_2$)·(HfO$_2$)$_{0.25}$ "core-shell" filler, obtained as described in the literature (see V. Di Noto et al., Int. J. Hydrogen Energy 37 (2012) 6199-6214) were added into 5 mL of DMF and treated in an ultrasonic bath for 2 h, yielding a homogenous dispersion, labeled "C". Solution B (see EXAMPLE 1) and C were added dropwise into A (see EXAMPLE 1). The remaining steps of the preparation of the Z-IEM were the same as those described in EXAMPLE 1. The overall IEC of the cation-conducting Z-IEM was equal to 0.66 meq·g$^{-1}$.

Example 14

The Z-IEM was obtained following exactly the same procedure described in EXAMPLE 1. The difference was that 0.026 g of (ZrO$_2$)·(Ta$_2$O$_5$)$_{0.119}$ "core-shell" filler, obtained as described in the literature (see V. Di Noto et al., J. Am. Chem. Soc. 46 (2012) 19099-19107) were added into 5 mL of DMF and treated in an ultrasonic bath for 2 h, yielding a homogenous dispersion, labeled "C". Solution B (see EXAMPLE 1) and C were added dropwise into A (see EXAMPLE 1). The remaining steps of the preparation of the Z-IEM were the same as those described in EXAMPLE 1. The overall IEC of the cation-conducting Z-IEM was equal to 0.64 meq·g$^{-1}$.

Example 15

The Z-IEM was obtained following exactly the same procedure described in EXAMPLE 9. The difference was that 0.026 g of (ZrO$_2$)·(HfO$_2$)$_{0.25}$ "core-shell" filler, obtained as described in the literature (see V. Di Noto et al., Int. J. Hydrogen Energy 37 (2012) 6199-6214) were added into 5 mL of DMF and treated in an ultrasonic bath for 2 h, yielding a homogenous dispersion, labeled "C". Solution B (see EXAMPLE 1) and C were added dropwise into A (see EXAMPLE 9). The remaining steps of the preparation of the Z-IEM were the same as those described in EXAMPLE 9. The overall IEC of the cation-conducting Z-IEM was equal to 0.66 meq·g$^{-1}$.

Example 16

8 mL of 6 wt % dispersion of Aquivion ionomer with an IEC of 1.2 meq·g$^{-1}$ and density of 0.875 g/cm$^3$ was used. The solvent was removed from the 6 wt % Aquivion dispersion by heating at 80° C. until a thin film was obtained. The film was then dissolved in 10 mL DMF at room temperature under vigorous stirring, that lasted for 2 h; the resulting solution was clear, and it was labelled "A". 0.037 g of [PVBTMA][Br]-b-[PMB] ionomer (IEC=2 meq·g$^{-1}$) that was synthesized by the method described in the literature (see: K. Vezzù et al., J. Am. Chem. Soc. 140 (2018) 1372-1384) were dissolved into 3 mL of DMF. This process was carried out at room temperature under vigorous stirring, that lasted for 1 h; the product was a clear solution, labeled "B". B was added dropwise into A, that was kept under vigorous stirring for 3 h at room temperature.

0.051 g of Si$_{80}$F synthesized by the published method (see V. Di Noto et al., J. Power Sources 195 (2010) 7734-7742) was added into 5 mL of DMF and treated in an ultrasonic bath for 2 h, yielding a homogenous dispersion, labeled "C". C was added dropwise into the mixture of A and B, that was kept under vigorous stirring for 3 h at room temperature. The obtained mixture underwent a solvent-casting process in a Petri dish, that was kept at 80° C. for 16 hours in a ventilated oven. The resulting Z-IEM was then dislodged from the Petri dish after immersion in hot bidistilled water (T=60° C.). The Z-IEM was then immersed into 1 M H$_2$SO$_4$ for 24 h at room temperature. The Z-IEM was then thoroughly washed with bidistilled water to remove the excess acid. Finally, the Z-IEM underwent two treatments in bidistilled water, each lasting two hours. The overall IEC of the cation-conducting Z-IEM was equal to 0.87 meq·g$^{-1}$.

Example 17

10 mL of 5 wt % dispersion of Nafion ionomer with an IEC of 0.92 meq·g$^{-1}$ was used. The solvent was removed from the 5 wt % Nafion dispersion by heating at 80° C. until a thin film is obtained. The film was then dissolved in 10 ml DMF at room temperature under vigorous stirring, that lasted for 2 h; the resulting solution was clear, and it was labelled "A". 0.039 g of [PVBTMA][Br]-b-[PMB] ionomer (IEC=2 meq·g$^{-1}$) that was synthesized by the method described in the literature (see: K. Vezzù et al., J. Am. Chem. Soc. 140 (2018) 1372-1384) were dissolved into 3 mL of DMF. This process was carried out at room temperature under vigorous stirring, that lasted for 1 h; the product was a clear solution, labeled "B". B was added dropwise into A, that was kept under vigorous stirring for 3 h at room temperature.

0.056 g of titanium dioxide doped with fluorine (TiO$_2$F) synthesized by the published method (see the patent WO2012017348A1) was added into 5 mL of DMF and treated in an ultrasonic bath for 2 h, yielding a homogenous dispersion, labeled "C". C was added dropwise into the mixture of A and B, that was kept under vigorous stirring for 3 h at room temperature. The obtained mixture underwent a solvent-casting process in a Petri dish, that was kept at 80° C. for 16 hours in a ventilated oven. The resulting Z-IEM was then dislodged from the Petri dish after immersion in hot bidistilled water (T=60° C.). The Z-IEM was then immersed into 1 M $H_2SO_4$ for 24 h at room temperature. The Z-IEM is then thoroughly washed with bidistilled water to remove the excess acid. Finally, the Z-IEM underwent two treatments in bidistilled water, each lasting two hours. The overall IEC of the cation-conducting Z-IEM was equal to 0.68 meq·g$^{-1}$.

Example 18

10 mL of 5 wt % dispersion of Nafion ionomer with an IEC of 0.92 meq·g$^{-1}$ was used. The solvent was removed from the 5 wt % Nafion dispersion by heating at 80° C. until a thin film was obtained. The film was then dissolved in 10 mL DMF at room temperature under vigorous stirring, that lasted for 2 h; the resulting solution was clear, and it was labelled "A". 0.039 g of FAA-3 ionomer in the brominated form were dissolved into 3 mL of DMF. This process was carried out at room temperature under vigorous stirring, that lasted for 1 h; the product was a clear solution, labeled "B". 0.010 g of graphene powders was added into 5 mL of DMF and treated in an ultrasonic bath for 2 h, yielding a homogenous dispersion, labeled "C". B and C are added dropwise into A, that was kept under vigorous stirring for 3 h at room temperature. The obtained mixture underwent a solvent-casting process in a Petri dish, that was kept at 80° C. for 16 hours in a ventilated oven. The resulting Z-IEM was then dislodged from the Petri dish after immersion in hot bidistilled water (T=60° C.).

The Z-IEM was then immersed into 1 M $H_2SO_4$ for 24 h at room temperature. The Z-IEM was then thoroughly washed with bidistilled water to remove the excess acid. Finally, the Z-IEM underwent two treatments in bidistilled water, each lasting two hours. The overall IEC of the cation-conducting Z-IEM was equal to 0.67 meq·g$^{-1}$.

Example 19

The Z-IEM was obtained following exactly the same procedure described in EXAMPLE 16. The only difference was that the dispersion "C" included 0.010 g of highly defective graphene nanoplatelets, obtained as described in the patent application PCT/EP2017/084801. The overall IEC of the cation-conducting Z-IEM was equal to 0.67 meq·g$^{-1}$.

Example 20

The Z-IEM was obtained following exactly the same procedure described in EXAMPLE 16. The only difference was that the dispersion "C" includes 0.010 g of single-walled carbon nanotubes (SWCNTs). The overall IEC of the cation-conducting Z-IEM was equal to 0.67 meq·g$^{-1}$.

Example 21

The Z-IEM was obtained following exactly the same procedure described in EXAMPLE 1. The difference was that 44.6 microliters of a water dispersion including 35 wt % of poly(diallyldimethylammonium chloride) (IEC=6.2 meq·g$^{-1}$, MW<100000) was taken to 50° C. in a ventilated oven until all the water was removed and a polymer film was obtained. The polymer film was then re-dissolved in 3 mL of DMF, yielding the solution labelled "B". All the remaining steps in the fabrication of the Z-IEM were the same as those reported in EXAMPLE 1. The overall IEC of the cation-conducting Z-IEM was equal to 0.67 meq·g$^{-1}$.

Example 22

The Z-IEM was obtained following exactly the same procedure described in EXAMPLE 1. The difference was that the solution "A" was obtained as follows. 10 mL of 5 wt % dispersion of Nafion ionomer with an IEC of 0.92 meq·g$^{-1}$ was used. The solvent was removed from the 5 wt % Nafion dispersion by heating at 80° C. until a thin film was obtained. The film was then re-dissolved in 10 mL DMF at room temperature under vigorous stirring, that lasted for 2 h. In this solution were added 0.016 g of PVDF; the resulting system was kept under vigorous stirring for 2 h, giving so rise to the solution "A". The overall IEC of the cation-conducting Z-IEM was 0.67 meq·g$^{-1}$.

Example 23

The Z-IEM was obtained following exactly the same procedure described in EXAMPLE 13. The difference was that the solution "A" used in the preparation of the Z-IEM was obtained as follows. 10 mL of 5 wt % dispersion of Nafion ionomer with an IEC of 0.92 meq·g$^{-1}$ was used. The solvent was removed from the 5 wt % Nafion dispersion by heating at 80° C. until a thin film was obtained. The film was then re-dissolved in 10 mL DMF at room temperature under vigorous stirring, that lasted for 2 h. In this solution were added 0.016 g of PVDF; the resulting system was kept under vigorous stirring for 2 h, giving so rise to the solution "A". The overall IEC of the cation-conducting Z-IEM was 0.67 meq·g$^{-1}$.

The invention claimed is:

1. A zipped ion-exchange membrane (Z-IEM) comprising at least one cation-exchange polyelectrolyte (CEP) cross-linked with at least one anion-exchange polyelectrolyte (AEP), wherein the CEP has a molar fraction of positive charges (x) so that:
   (i) when x=0.5, the Z-IEM is a completely neutralized IEM;
   (ii) when x>0.5, the Z-IEM is a cation-conducting IEM; and
   (iii) when x<0.5, the Z-IEM is an anion-conducting IEM
   wherein said zipped ion-exchange membrane is a membrane having a molecular structure wherein a first macromolecular chain bearing positive charges is coupled to a second macromolecular chain bearing negative charges, the coupling being given by electrostatic interaction between opposite charges facing each other; and wherein throughout the Z-IEM, neighboring acceptor functional groups bearing positive charges found on AEPs interact with neighboring electron donor functional groups bearing negative charges found on CEPs so that in the Z-IEM the backbone chains of each AEP-CEP interacting system run substantially parallel to one another at the interface in a zip-zone, wherein ordered arrays of donor-acceptor bonds are formed.

2. The zipped ion-exchange membrane according to claim 1, wherein the at least one cation-exchange polyelectrolyte (CEP) is selected from polyelectrolytes comprising at least one functional group selected from the group consisting of: —$SO_3^-$; —$CO_2^-$; —$PO_3^-$; —$ClO_3^-$; and —$BrO_2^-$.

3. The zipped ion-exchange membrane according to claim 1, wherein the at least one anion-exchange polyelectrolyte (AEP) is selected from polyelectrolytes comprising at least one functional group selected from the group consisting of: quaternary ammonium groups; guanidinium groups; amino groups; pyridine groups; imidazolium groups; phosphonium groups; and other cationic groups that may or may not be based on metals.

4. The zipped ion-exchange membrane according to claim 1, wherein the Z-IEM also comprises at least one polymeric component that comprises neither cation-exchange nor anion-exchange functional groups.

5. The zipped ion-exchange membrane according to claim 4, wherein the at least one polymeric component is selected from the group consisting of: polyvinylidene difluoride; polystyrene; polyvinyl alcohol; polyethylene glycol; polyacrylonitrile, and polybenzimidazole.

6. The zipped ion-exchange membrane according to claim 1, wherein the Z-IEM also comprises at least one filler.

7. The zipped ion-exchange membrane according to claim 6, wherein the fillers comprises one or more of oxides, oxoclusters, and "core-shell" oxoclusters.

8. The zipped ion-exchange membrane according to claim 6, wherein the at least one filler is selected from the group consisting of: carbon black; carbon nanotubes or one of derivatives thereof; and graphene or one of derivatives thereof.

9. The zipped ion-exchange membrane according to claim 1, wherein the at least one cation-exchange polyelectrolyte (CEP) crosslinked with at least one anion-exchange polyelectrolyte (AEP) is a crosslinked ion-exchange resin.

10. A method for the preparation of zipped the ion-exchange membrane according to claim 1, obtained by the following reaction:

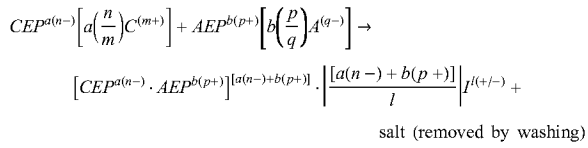

salt (removed by washing)

wherein:
(i) CEP is a cation-exchange polyelectrolyte, able to exchange $C^{(m+)}$ cations, itself bearing "a" anionic groups, each with a charge equal to "n−" elementary charges;
(ii) AEP is an anion-exchange polyelectrolyte, able to exchange $A^{(q-)}$ anions, itself bearing "b" cationic groups, each with a total charge equal to "p+" elementary charges;
(iii) "$I^{(+/-)}$" is the ion that can be exchanged by the Z-IEM; and
(iv) the "salt" is obtained by the reaction of the cations and the anions provided by the starting CEP and AEP, respectively.

11. A process for producing the zipped ion-exchange membrane according to claim 1, the process including the following steps:
suspending or dissolving at least one cation-exchange polyelectrolyte (CEP) and at least one anion-exchange polyelectrolyte (AEP) in at least one solvent selected from: N,N-dimethylformamide (DMF); dimethylacetamide; 2-pyrrolidone (NMP); water; alcohols; ketones; aldehydes; carboxylic acids; amines; halogenated solvents; hydrocarbon solvents,
casting the suspension/solution thus obtained, and
under a controlled temperature, removing, through evaporation, the at least one solvent, thus obtaining the zipped ion-exchange membrane.

12. The process according to claim 11, wherein the zipped ion-exchange membrane thus obtained further undergoes one or more of the following treatments:
treatment in one or more solutions, comprising water or other solvents dissolving either: (i) acid species; (ii) one or more base; (iii) one or more other ionic specie; (iv) one or more neutral specie, and
thermomechanical treatments, that include but are not limited to hot-pressing.

* * * * *